Figure 1:
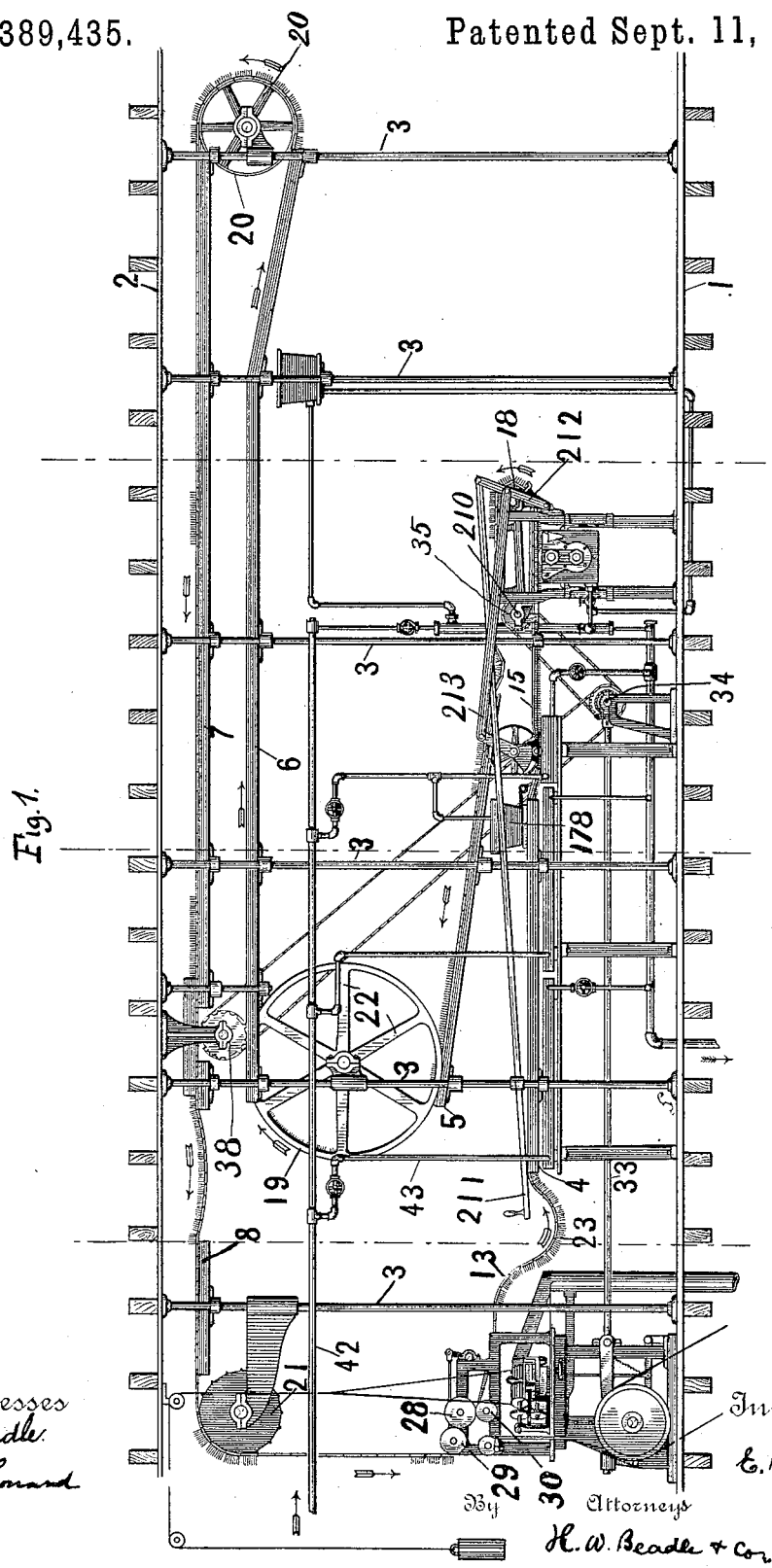
Figure 2:
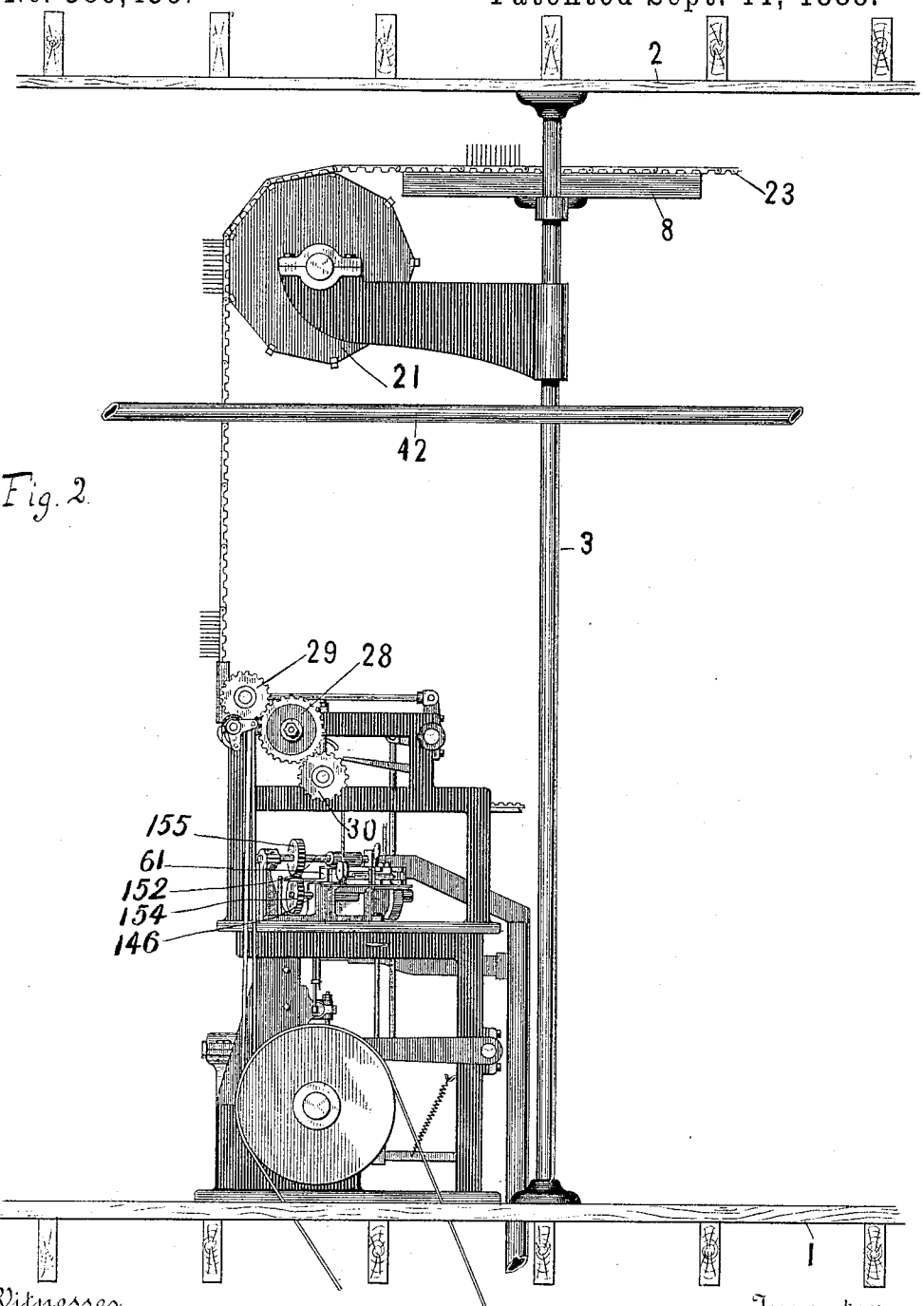

(No Model.) 32 Sheets—Sheet 1.

E. B. BEECHER.
MACHINE FOR MAKING MATCHES.

No. 389,435. Patented Sept. 11, 1888.

(No Model.) 32 Sheets—Sheet 5.
E. B. BEECHER.
MACHINE FOR MAKING MATCHES.
No. 389,435. Patented Sept. 11, 1888.

Witnesses
H. L. Biadle
E. D. Leonard

Inventor
E. B. Beecher
By Attorneys
H. W. Beadle & Co.

(No Model.)  
32 Sheets—Sheet 6.

E. B. BEECHER.
MACHINE FOR MAKING MATCHES.

No. 389,435. Patented Sept. 11, 1888.

Witnesses  
H. L. Beadle  
O. D. Leonard

Inventor  
E. B. Beecher

By Attorneys  
H. W. Beadle & Co.

(No Model.) 32 Sheets—Sheet 8.

E. B. BEECHER.
MACHINE FOR MAKING MATCHES.

No. 389,435. Patented Sept. 11, 1888.

Witnesses
H. W. Beadle.
E. D. Leonard.

Inventor
E. B. Beecher

By Attorneys
H. W. Beadle & Co.

(No Model.)  32 Sheets—Sheet 9.

E. B. BEECHER.
MACHINE FOR MAKING MATCHES.

No. 389,435. Patented Sept. 11, 1888.

Witnesses
H. L. Beadle.
E. D. Leonard.

Inventor
E. B. Beecher

By Attorneys
H. W. Beadle & Co.

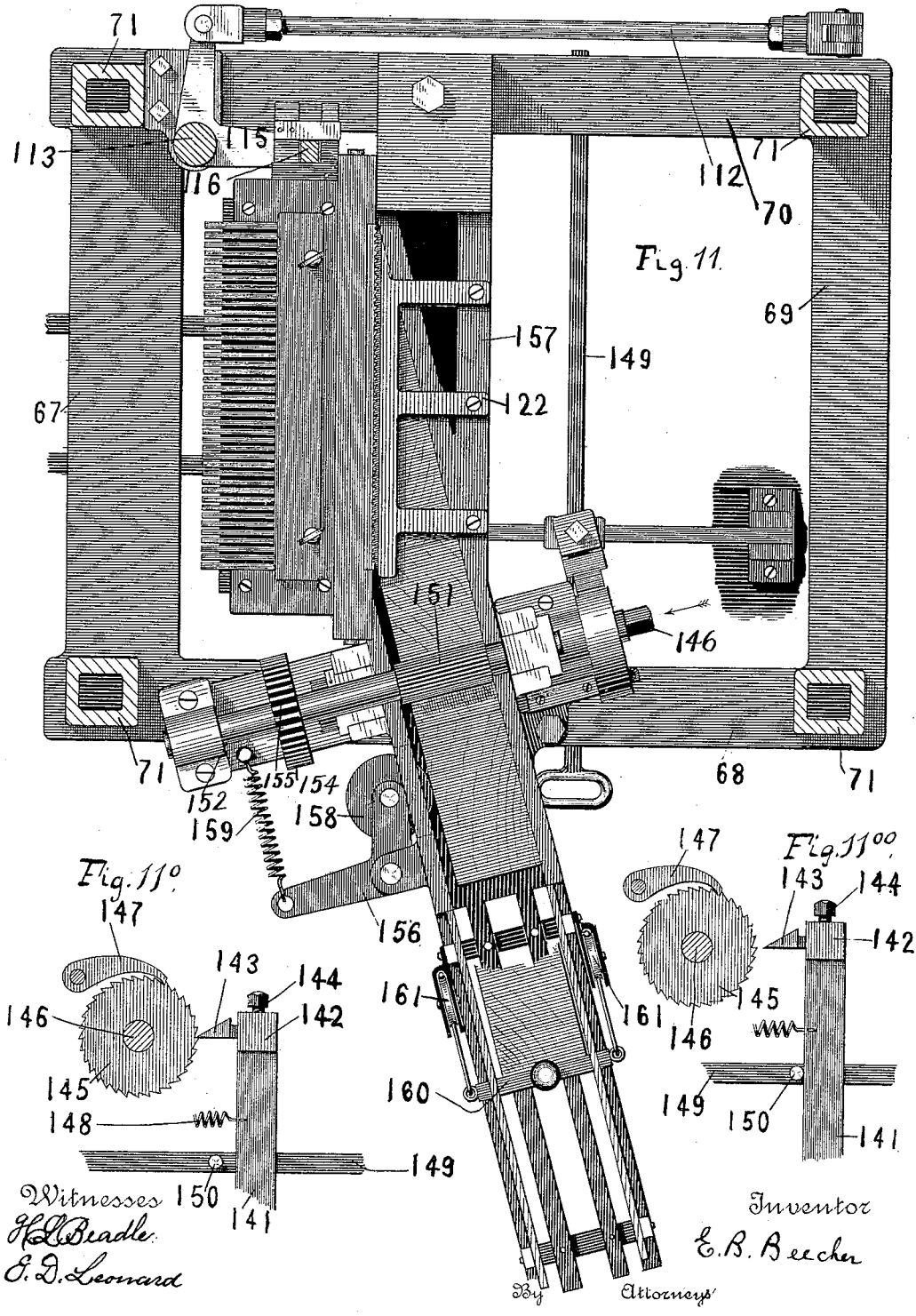

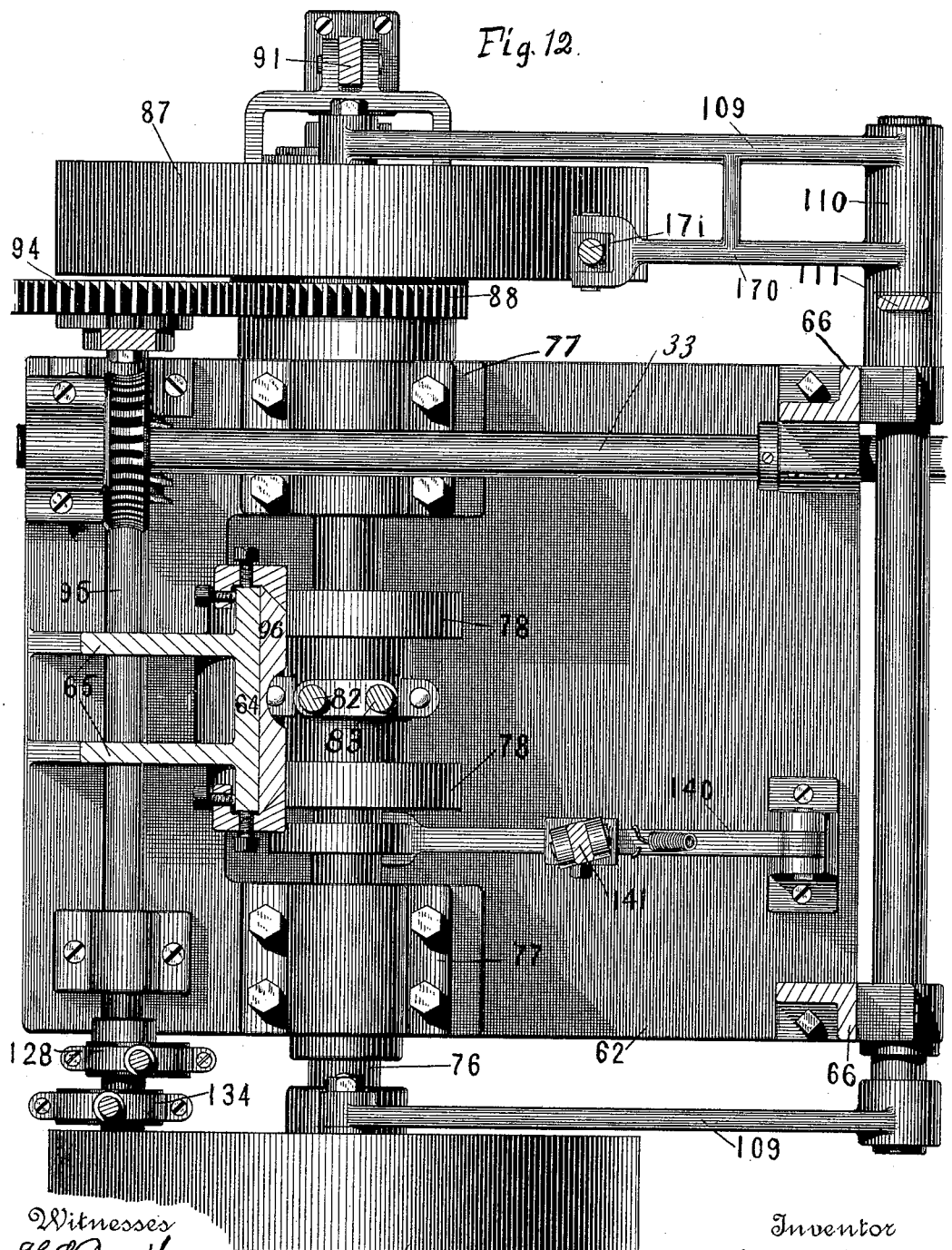

(No Model.) 32 Sheets—Sheet 12.
E. B. BEECHER.
MACHINE FOR MAKING MATCHES.
No. 389,435. Patented Sept. 11, 1888.
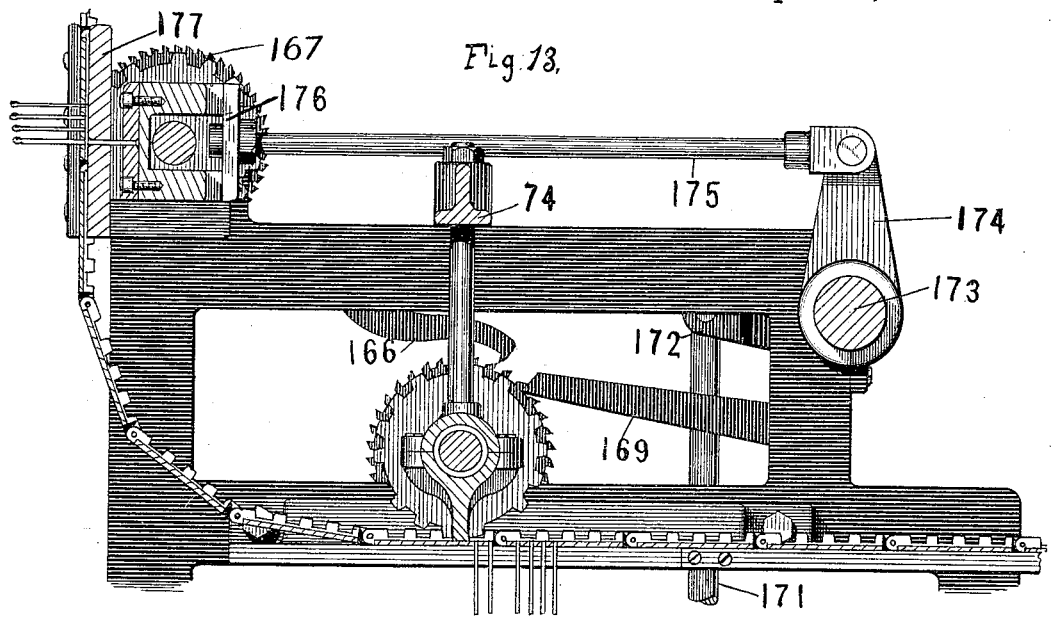
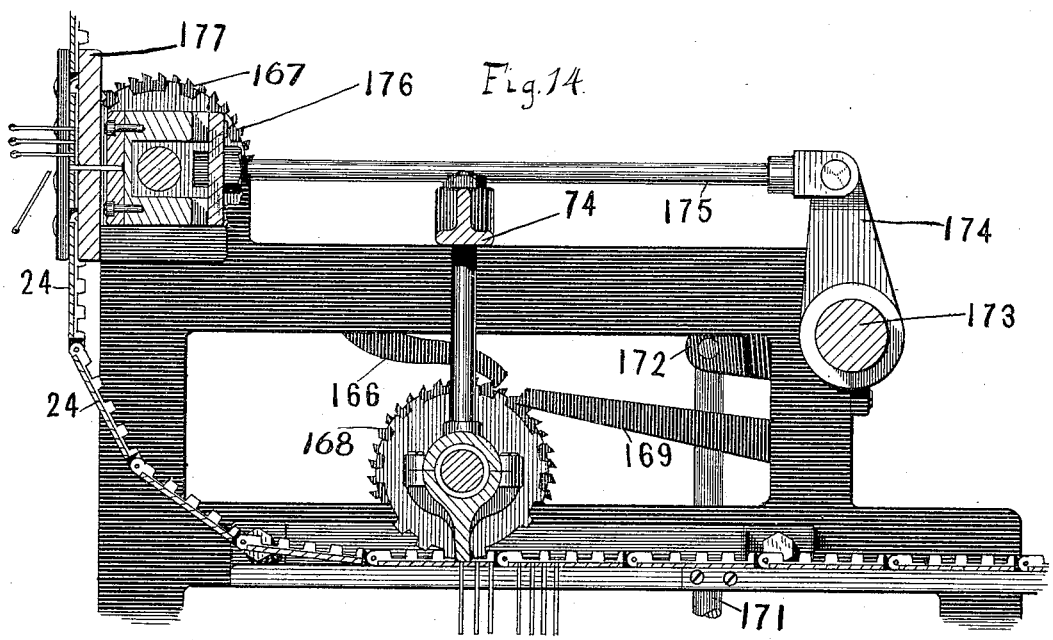
Witnesses
H. L. Beadle.
E. D. Leonard.
Inventor
E. B. Beecher
By Attorneys
H. W. Beadle &Co (No Model.) 32 Sheets—Sheet 13.
E. B. BEECHER.
MACHINE FOR MAKING MATCHES.
No. 389,435. Patented Sept. 11, 1888.
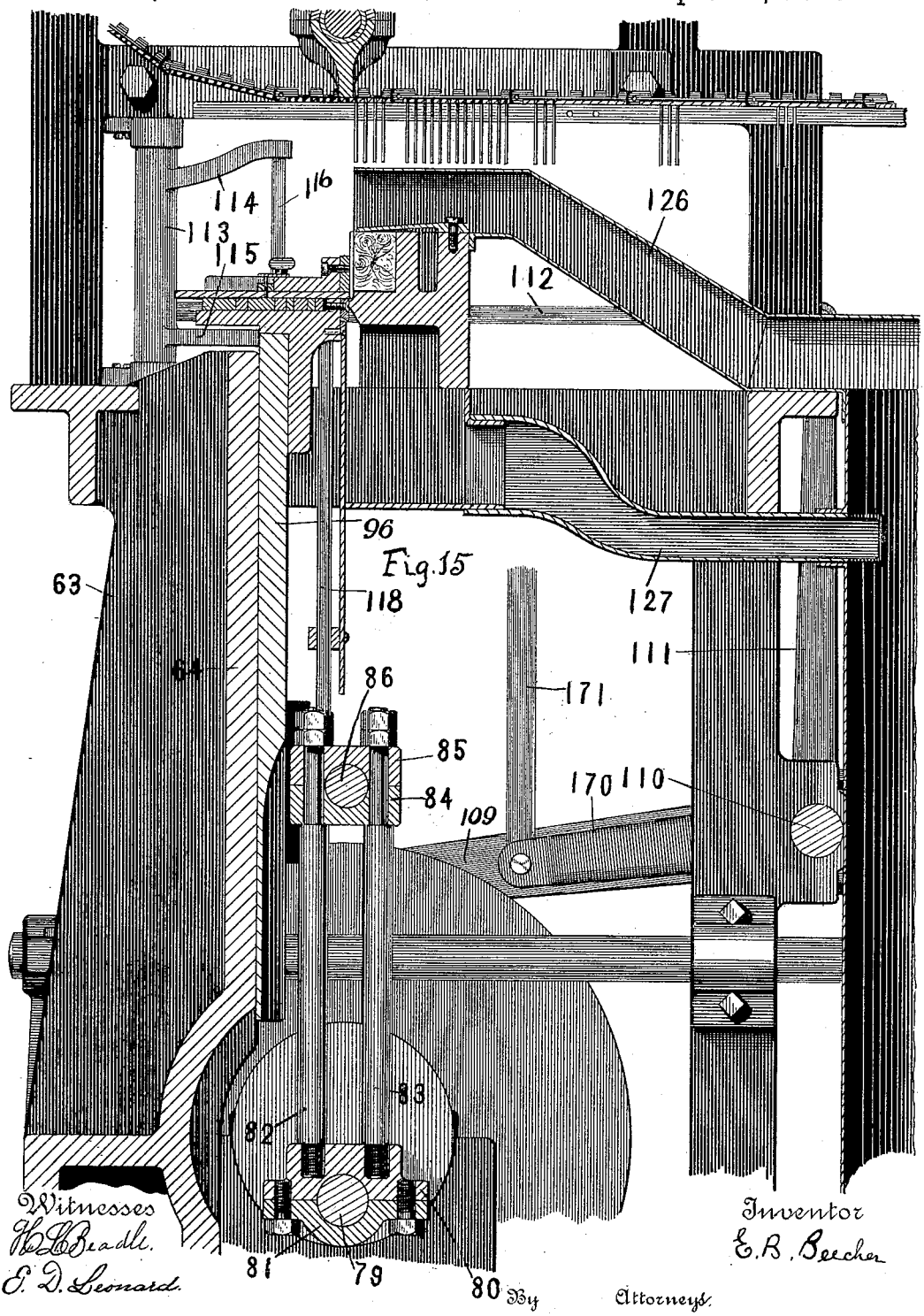

(No Model.) 32 Sheets—Sheet 14.
E. B. BEECHER.
MACHINE FOR MAKING MATCHES.
No. 389,435. Patented Sept. 11, 1888.
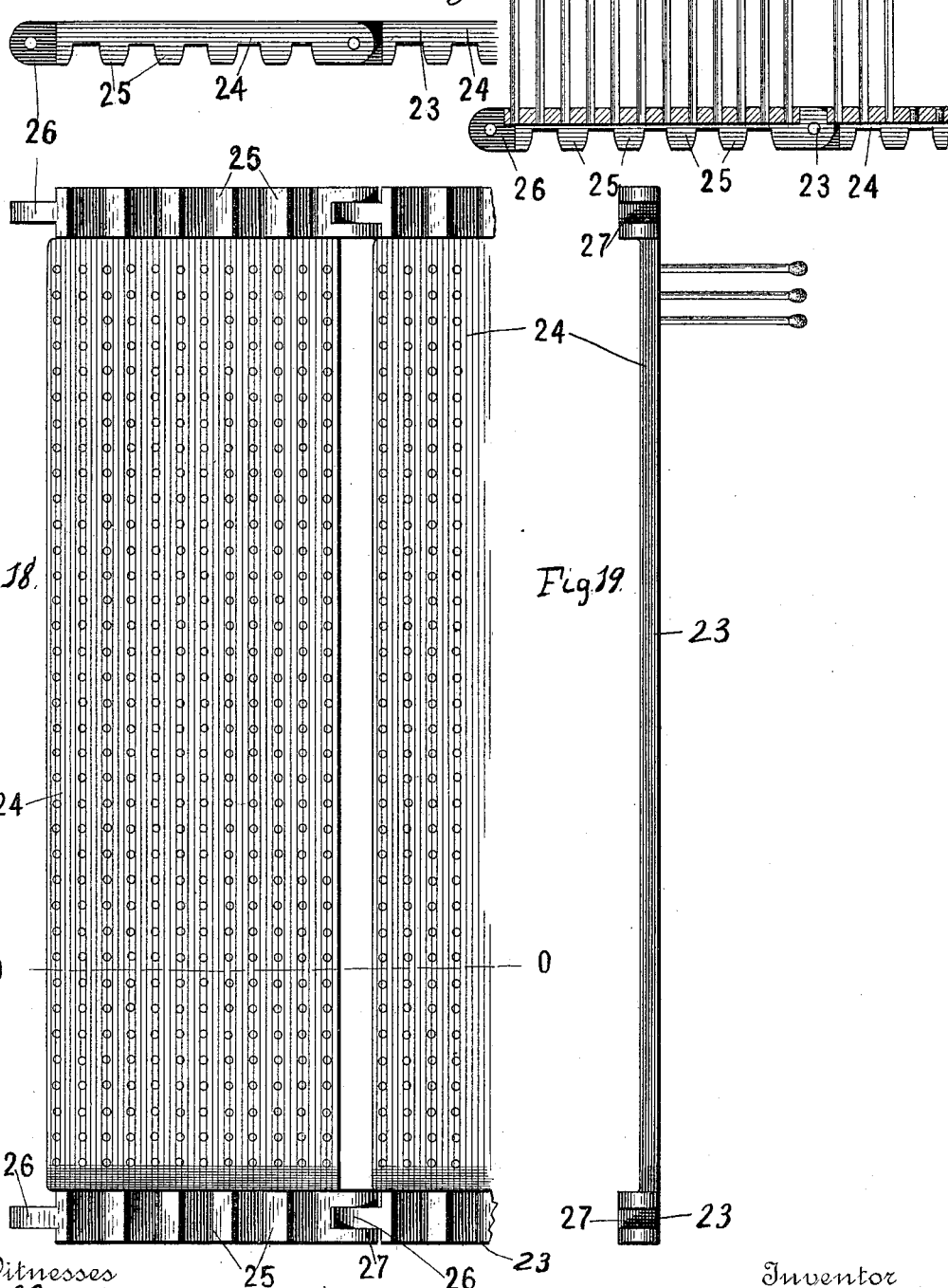
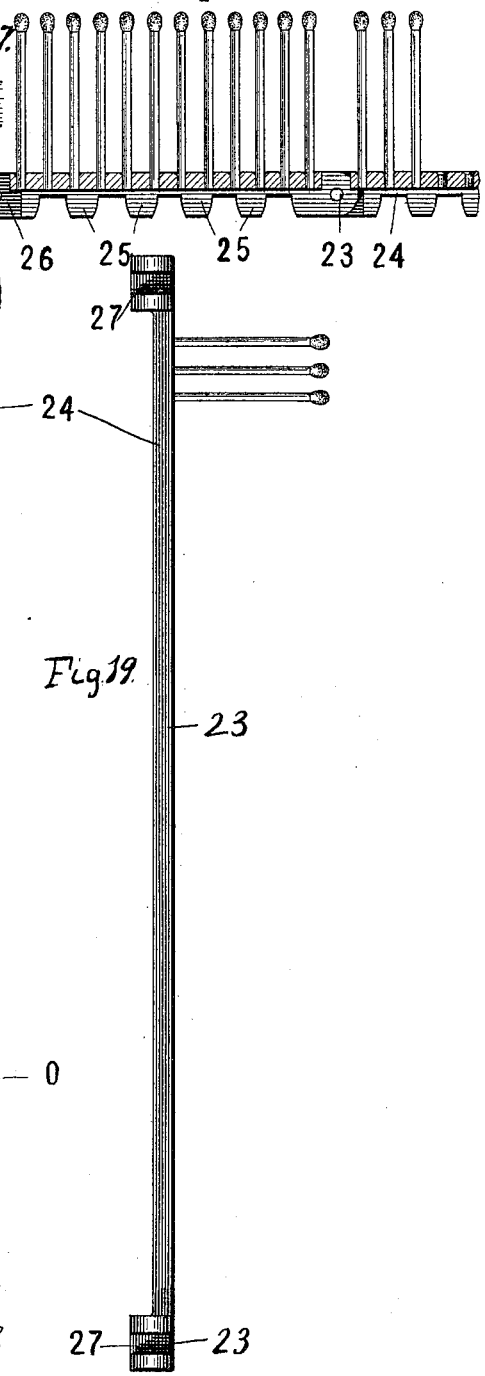
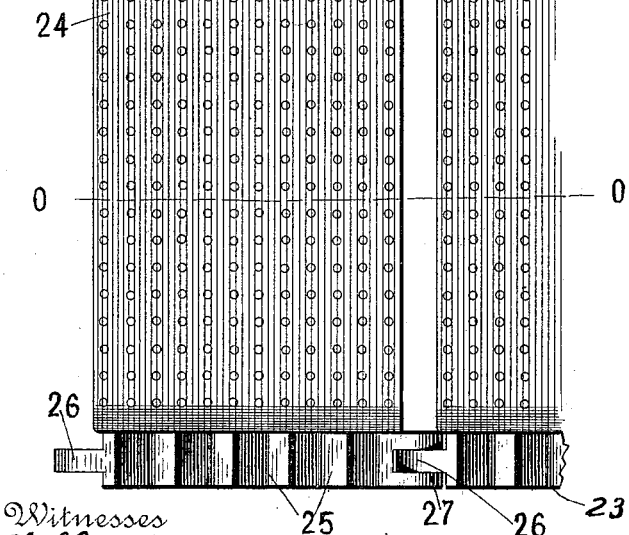
Witnesses
H. L. Beadle
E. D. Leonard
Inventor
E. B. Beecher
By Attorneys
H. W. Beadle & Co.

(No Model.)
32 Sheets—Sheet 15.
E. B. BEECHER.
MACHINE FOR MAKING MATCHES.
No. 389,435. Patented Sept. 11, 1888.
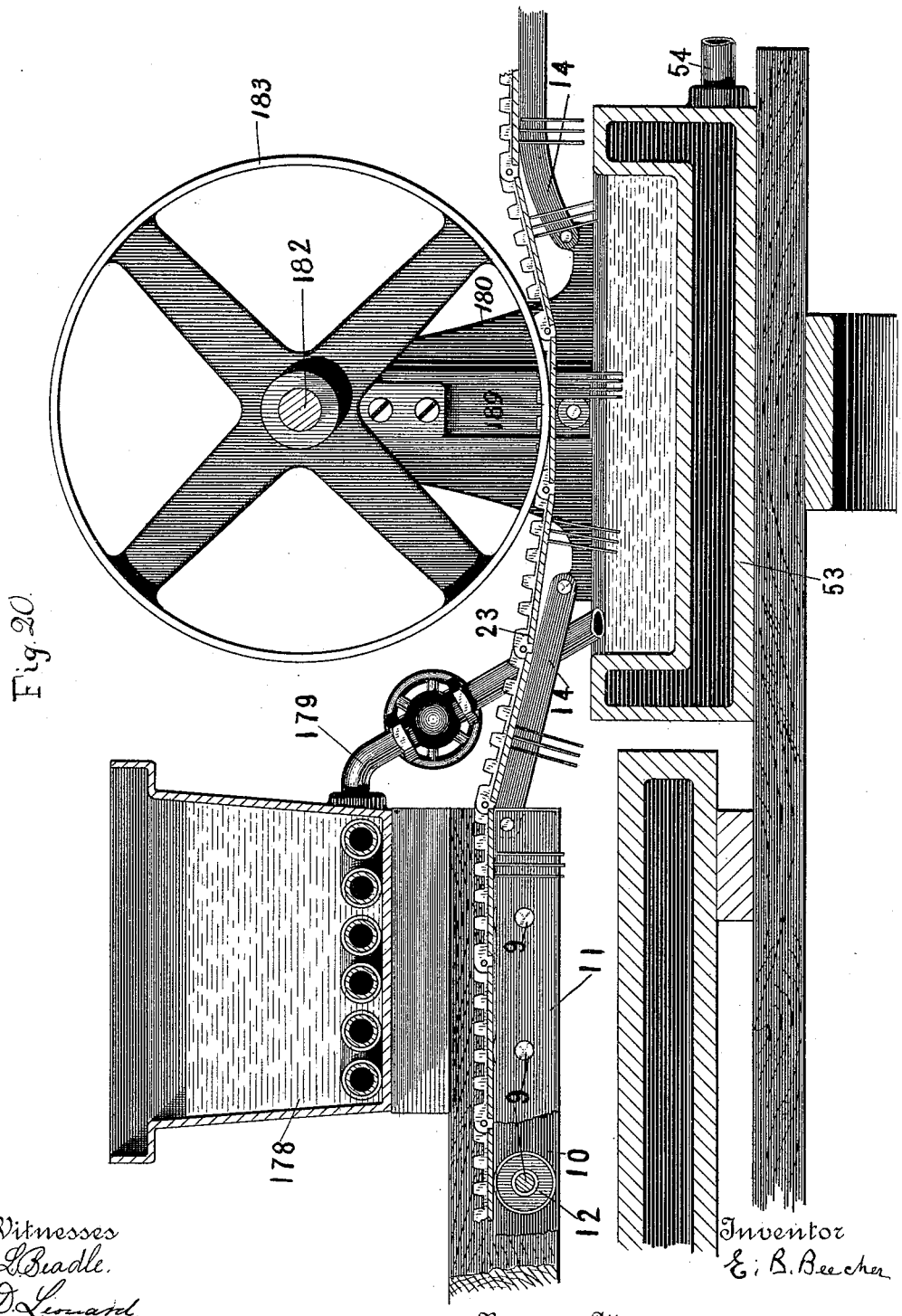

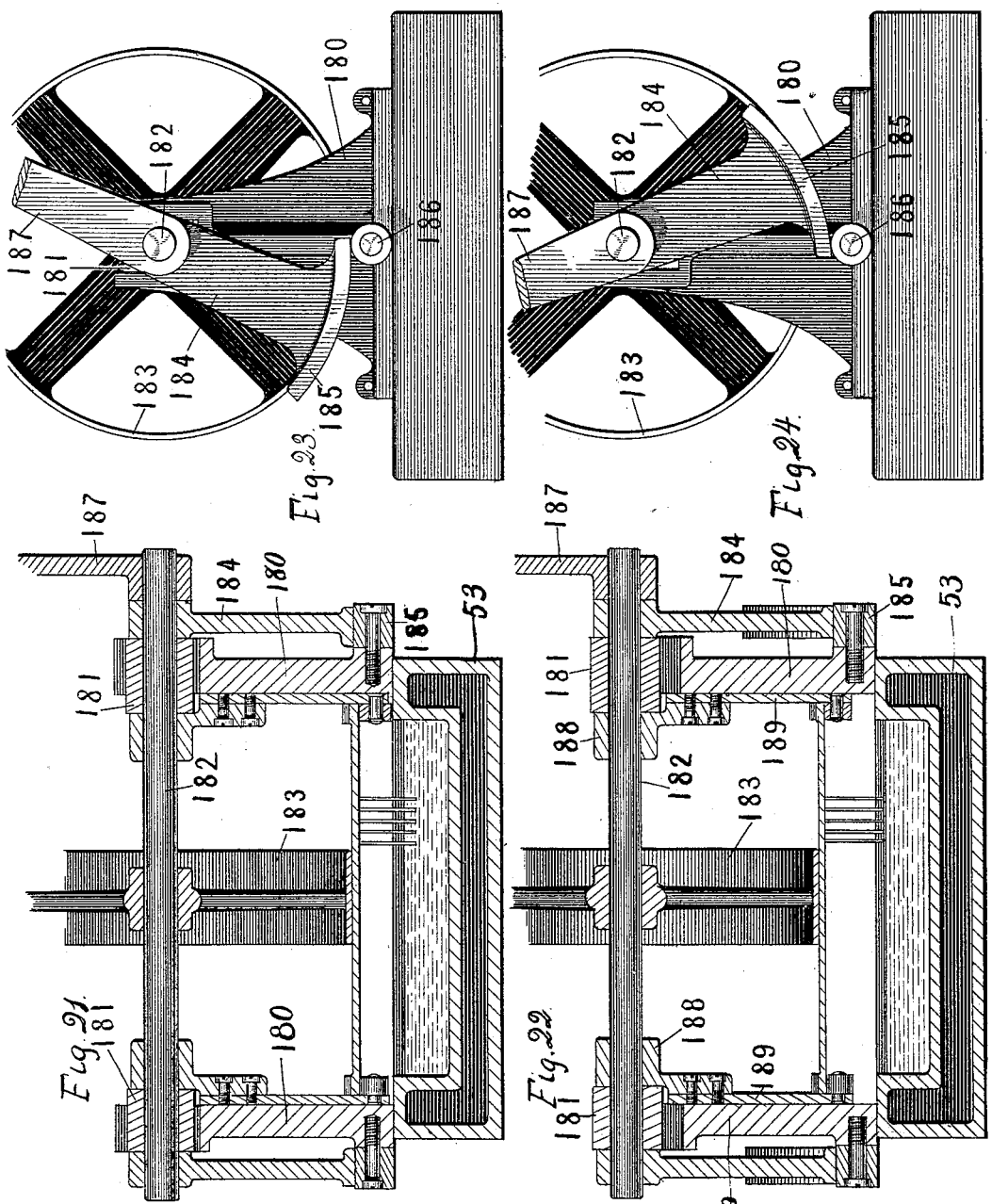

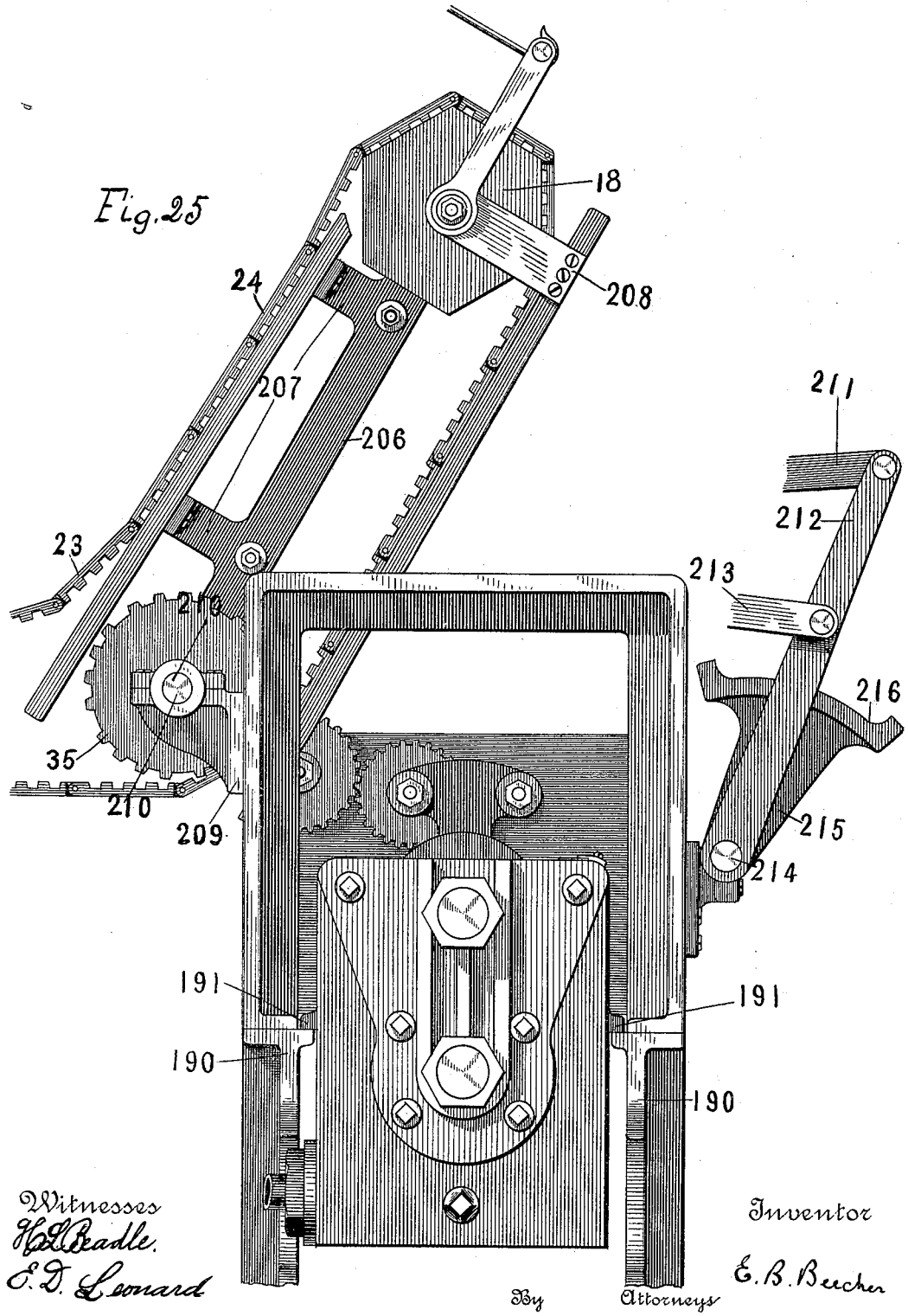

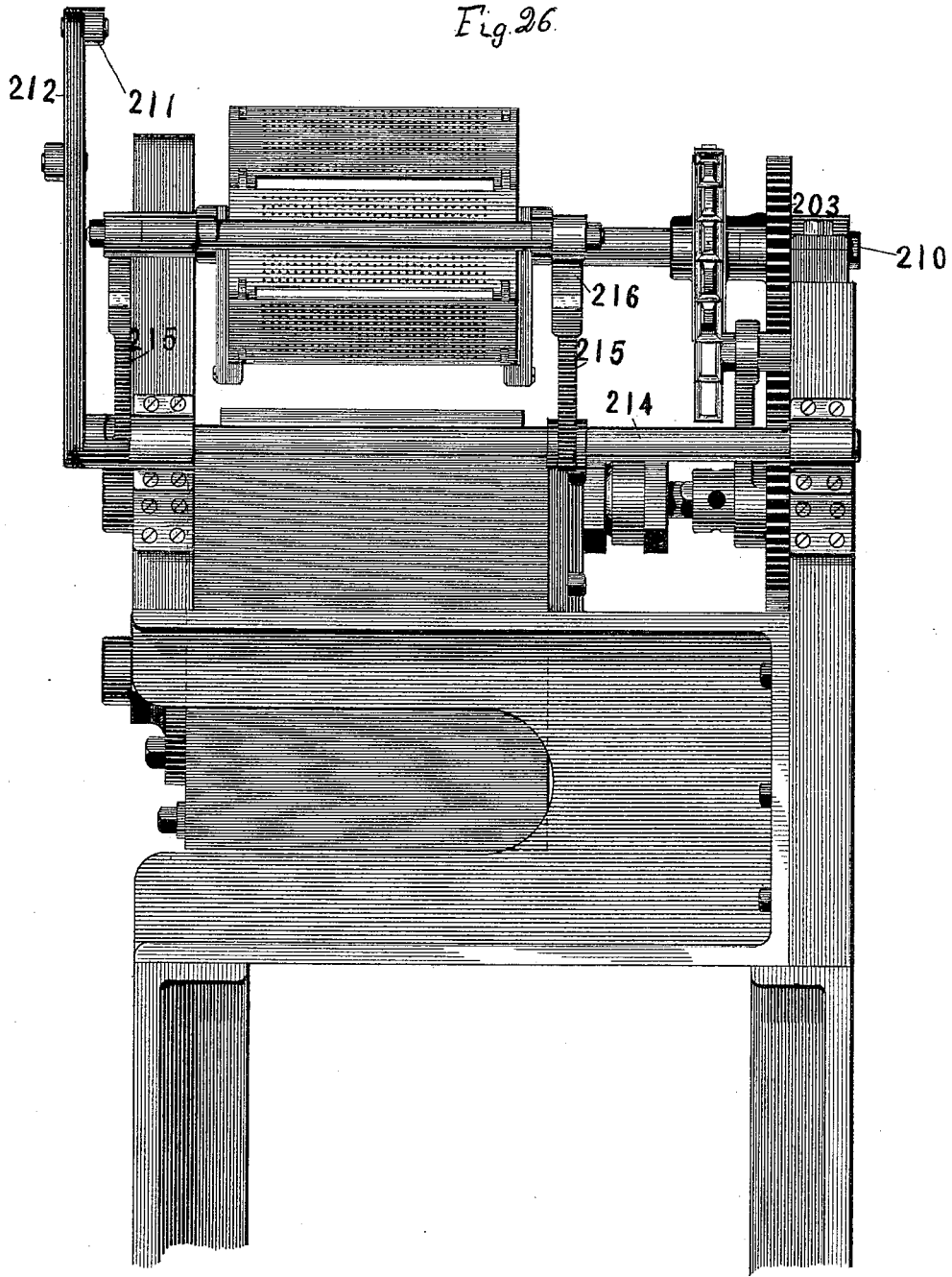

(No Model.)

32 Sheets—Sheet 19.

E. B. BEECHER.
MACHINE FOR MAKING MATCHES.

No. 389,435. Patented Sept. 11, 1888.

Witnesses
H. L. Beadle
E. D. Leonard

Inventor
E. B. Beecher

Attorneys H. W. Beadle & Co.

(No Model.)  32 Sheets—Sheet 20.
E. B. BEECHER.
MACHINE FOR MAKING MATCHES.
No. 389,435.  Patented Sept. 11, 1888.
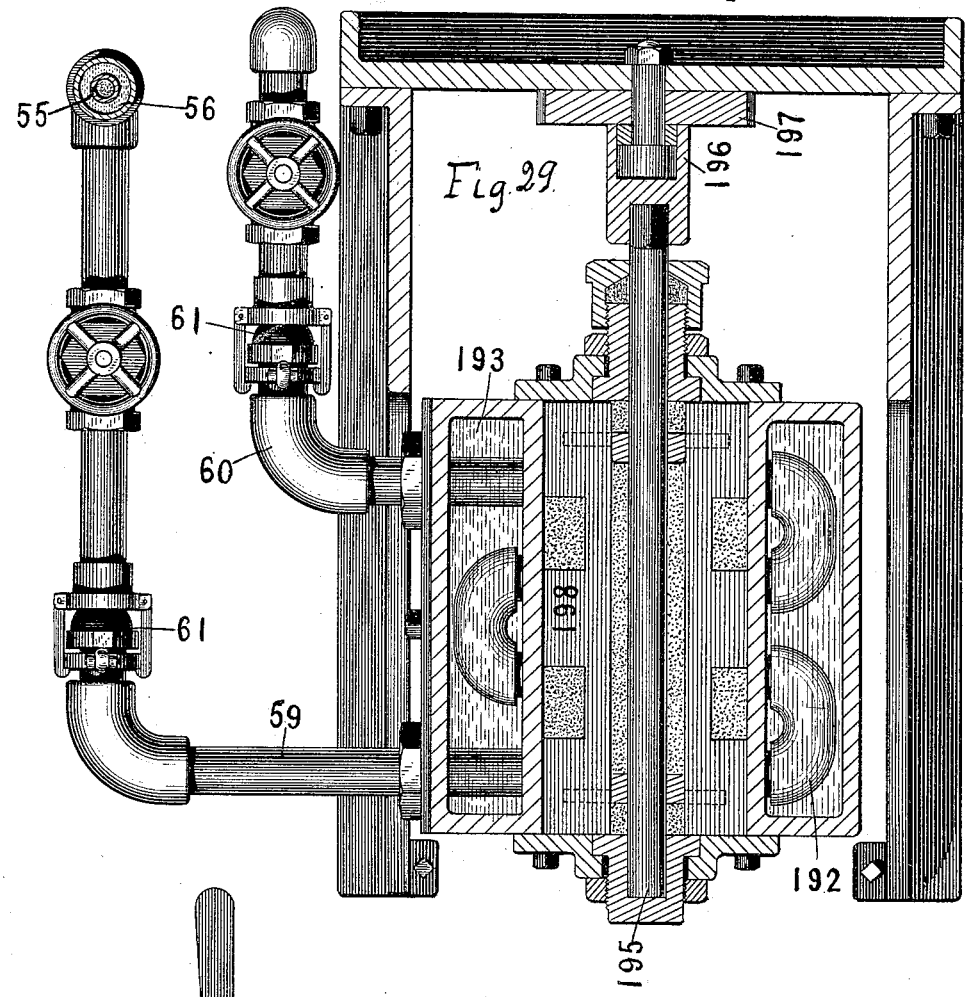
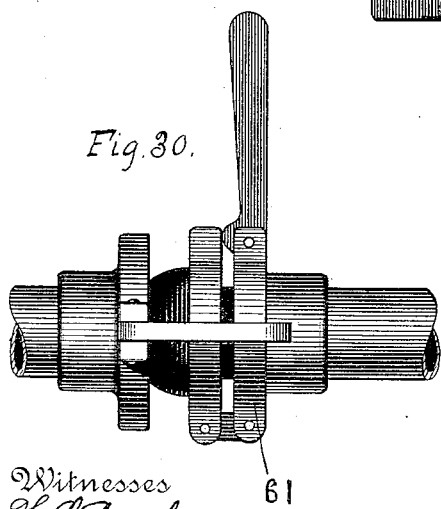
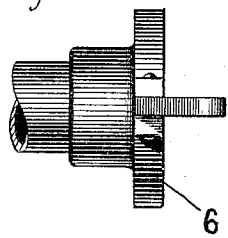
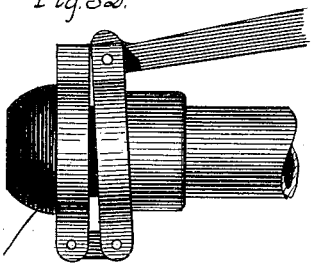
Witnesses
H. L. Beadle
E. D. Leonard.
Inventor
E. B. Beecher
By Attorneys,
H. W. Beadle & Co.
N. PETERS, Photo-Lithographer, Washington, D. C.

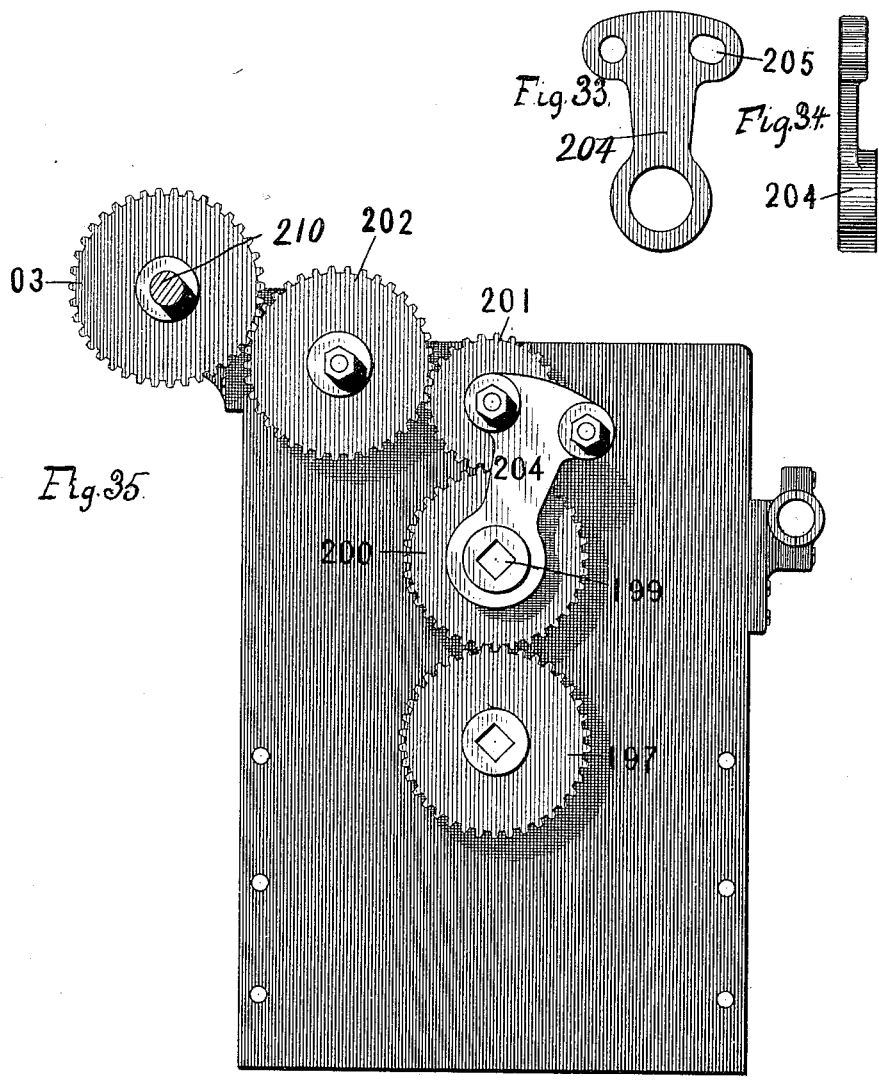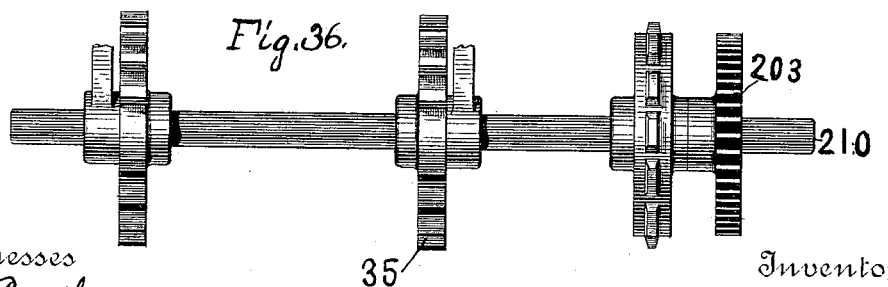

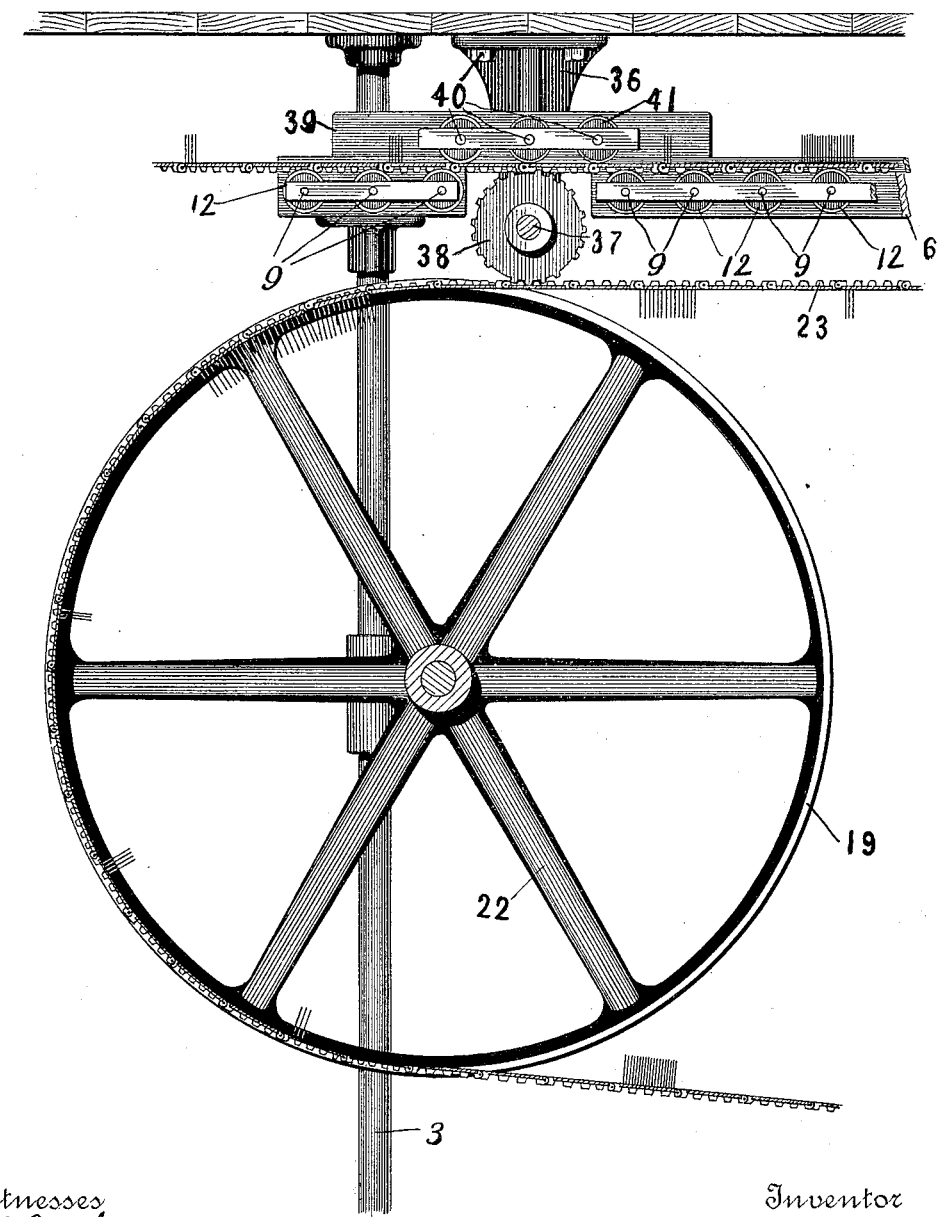

(No Model.) 32 Sheets—Sheet 23.
E. B. BEECHER.
MACHINE FOR MAKING MATCHES.

No. 389,435. Patented Sept. 11, 1888.

Witnesses:
E. D. Leonard
H. L. Beadle

Inventor
E. B. Beecher

By Attorneys
H. W. Beadle & Co.

(No Model.) 32 Sheets—Sheet 27.

E. B. BEECHER.
MACHINE FOR MAKING MATCHES.

No. 389,435. Patented Sept. 11, 1888.

(No Model.)  32 Sheets—Sheet 28.

E. B. BEECHER.
MACHINE FOR MAKING MATCHES.

No. 389,435.  Patented Sept. 11, 1888.

Witnesses
E. D. Leonard
H. W. Beadle

Inventor
E. B. Beecher
By Attorneys
H. W. Beadle & Co.

(No Model.) 32 Sheets—Sheet 29.
E. B. BEECHER.
MACHINE FOR MAKING MATCHES.

No. 389,435. Patented Sept. 11, 1888.

Witnesses
H. L. Beadle.
E. D. Leonard

Inventor
E. B. Beecher
By Attorneys
H. W. Beadle & Co.

(No Model.) 32 Sheets—Sheet 30.

E. B. BEECHER.
MACHINE FOR MAKING MATCHES.

No. 389,435. Patented Sept. 11, 1888.

Witnesses
E. D. Leonard
H. L. Beadle

Inventor
E. B. Beecher
By Attorneys
H. W. Beadle & Co.

(No Model.) 32 Sheets—Sheet 31.
E. B. BEECHER.
MACHINE FOR MAKING MATCHES.

No. 389,435. Patented Sept. 11, 1888.

Witnesses
H. L. Beadle
E. D. Leonard

Inventor
E. B. Beecher
By Attorneys
H. W. Beadle & Co.

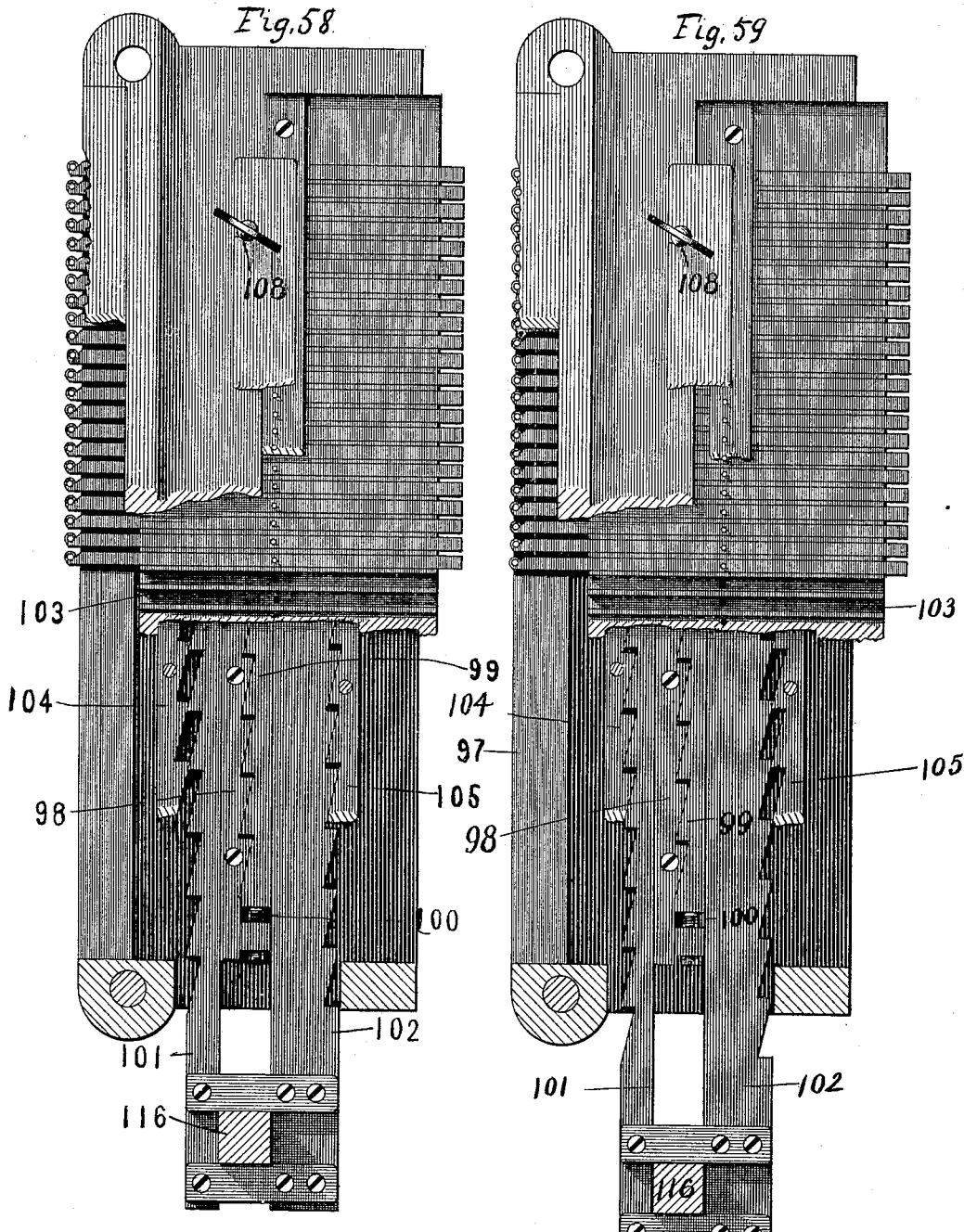

UNITED STATES PATENT OFFICE.

EBENEZER B. BEECHER, OF WESTVILLE, CONNECTICUT.

MACHINE FOR MAKING MATCHES.

SPECIFICATION forming part of Letters Patent No. 389,435, dated September 11, 1888.

Application filed February 2, 1888. Serial No. 262,816. (No model.)

*To all whom it may concern:*

Be it known that I, EBENEZER B. BEECHER, a citizen of the United States, residing at Westville, in the county of New Haven and State of Connecticut, have invented a new and useful Machine for Making Matches, of which the following is a specification.

This invention relates to the manufacture of matches from the prepared match-blocks in one continuous operation; and it consists, mainly, in the combination of an endless chain having a series of perforated plates, with a machine adapted to cut the match-sticks from the blocks, to insert the same into the perforated plates of the endless chain, and after the chain has passed over the proper apparatus for completing the manufacture of the matches and has made a complete circuit and returned to the machine again to discharge the completed matches from the machine.

It consists, also, in other combinations and in certain specific features of construction, all of which will be fully described hereinafter.

Figure 6:
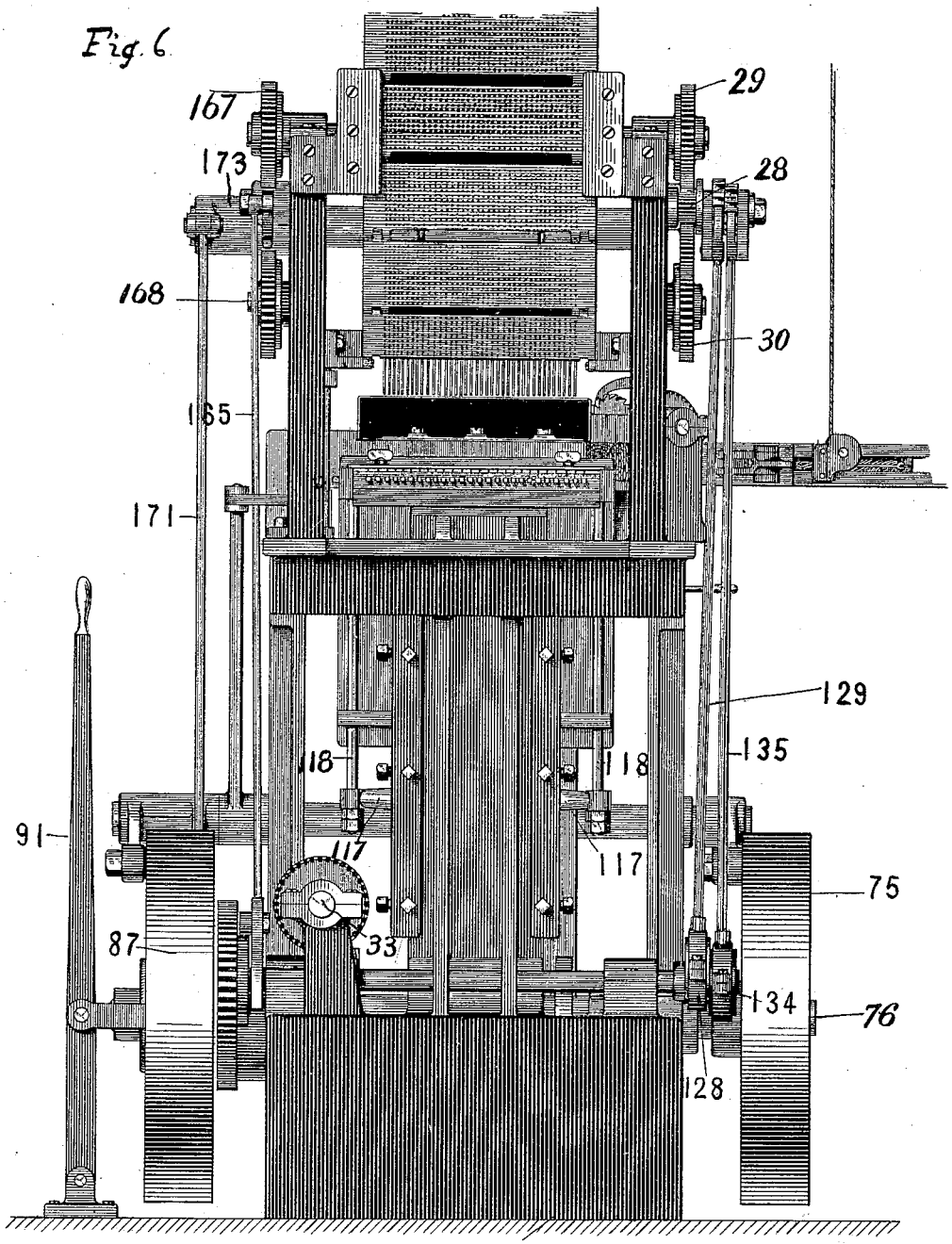
Figure 7:
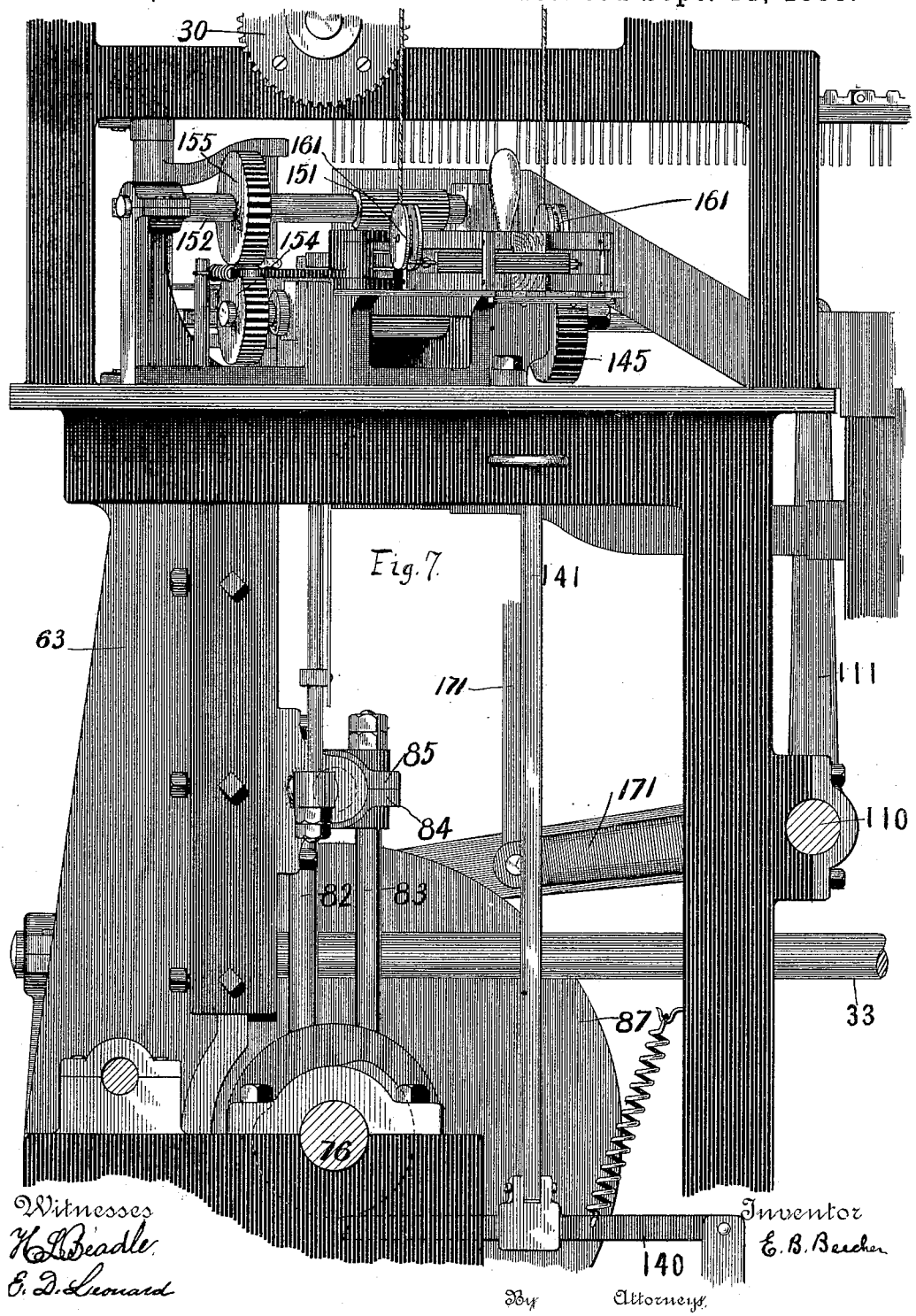
Figure 8:
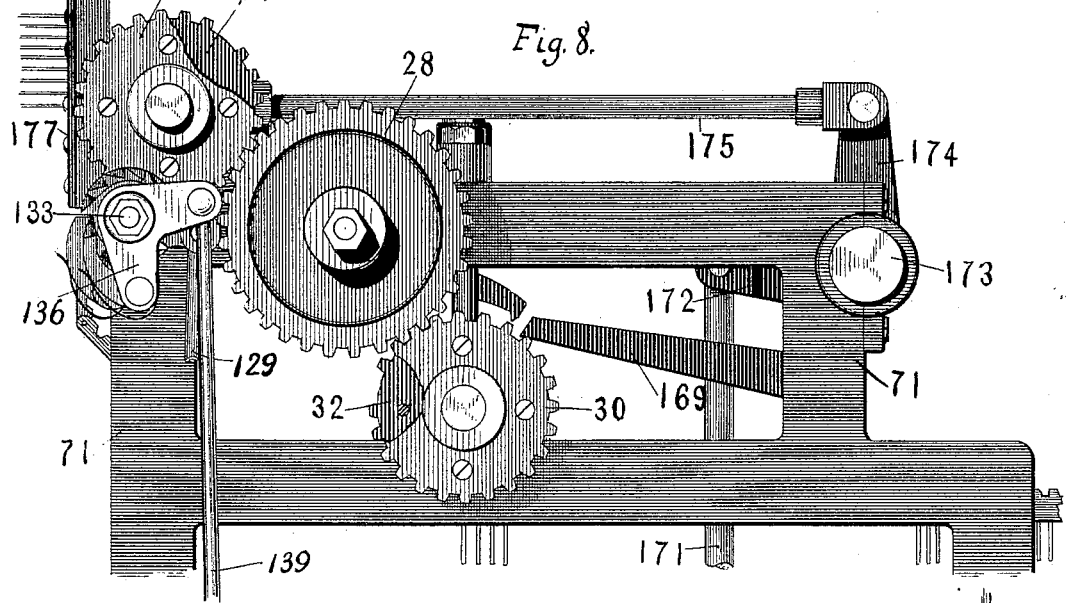
Figure 9:
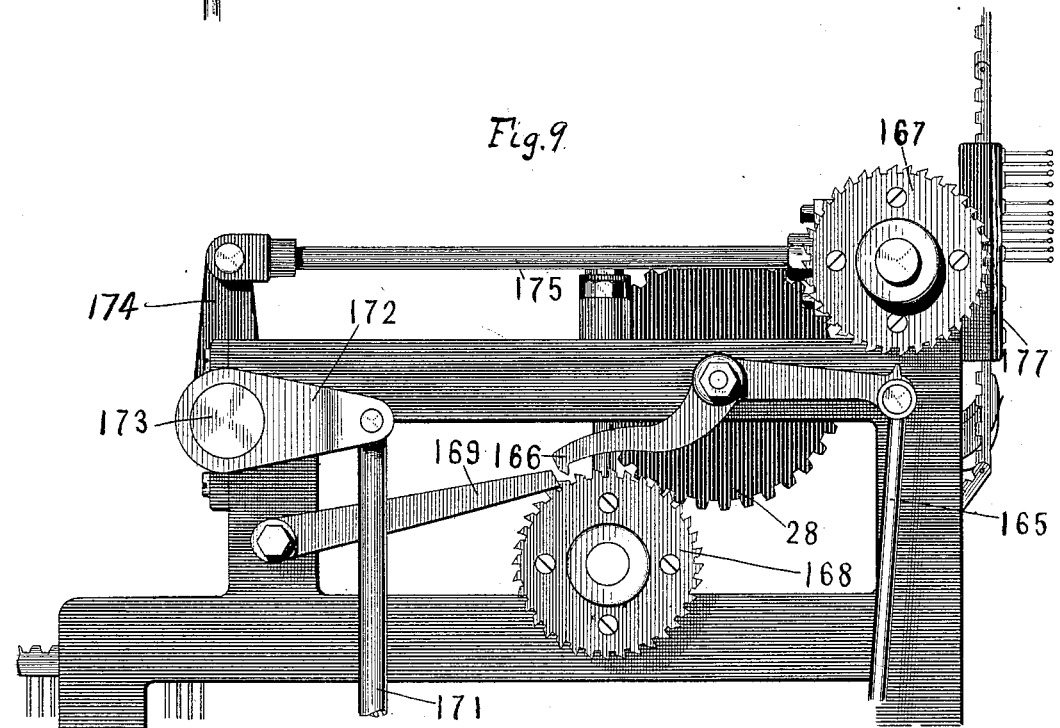
Figure 10:
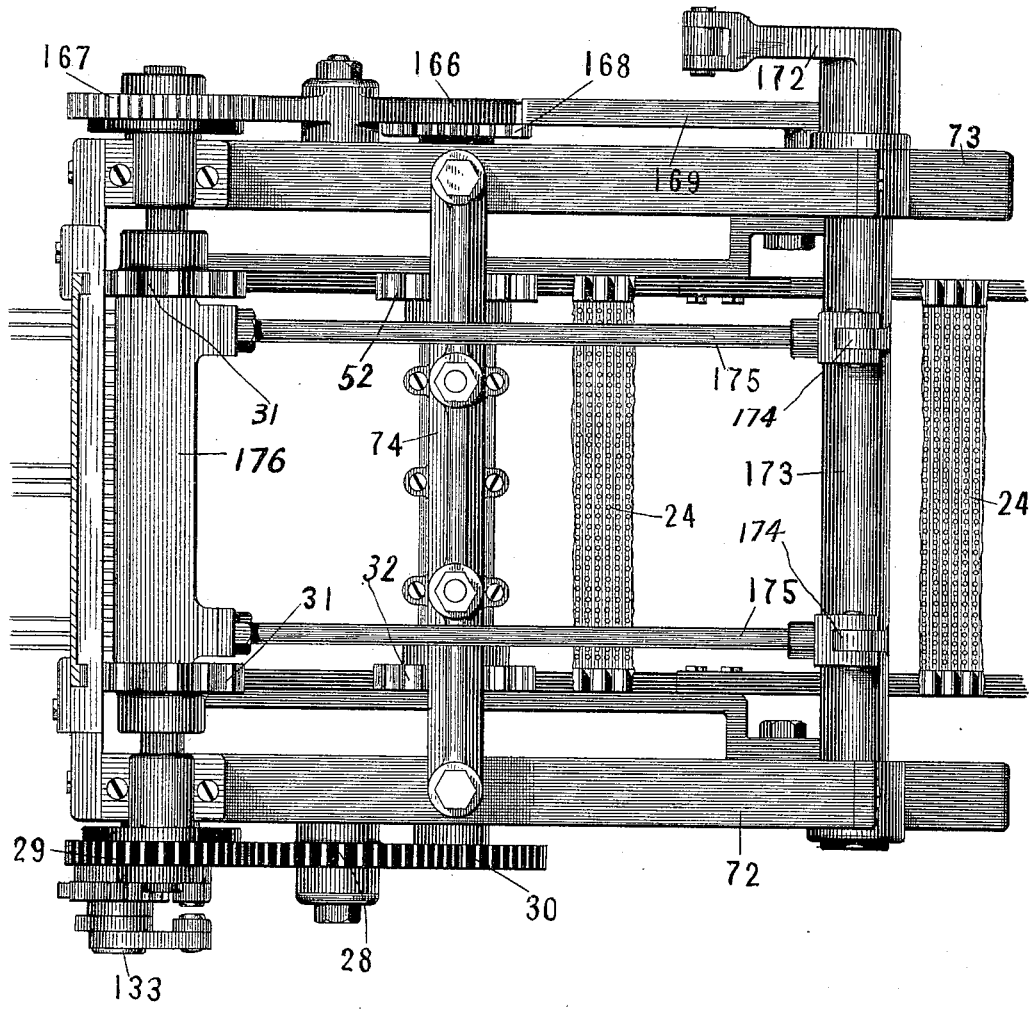
Figure 27:
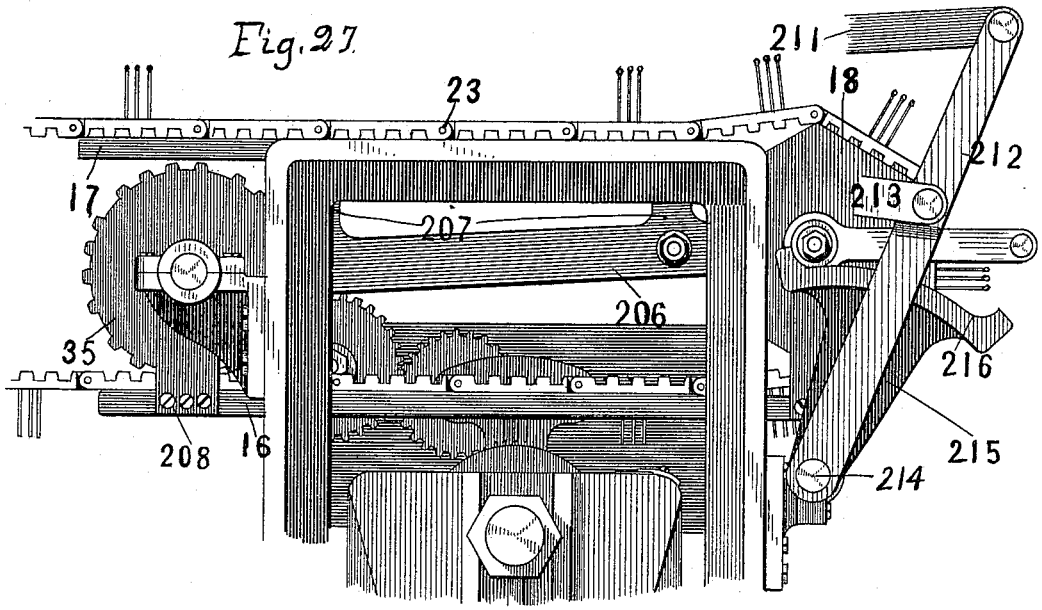
Figure 28:
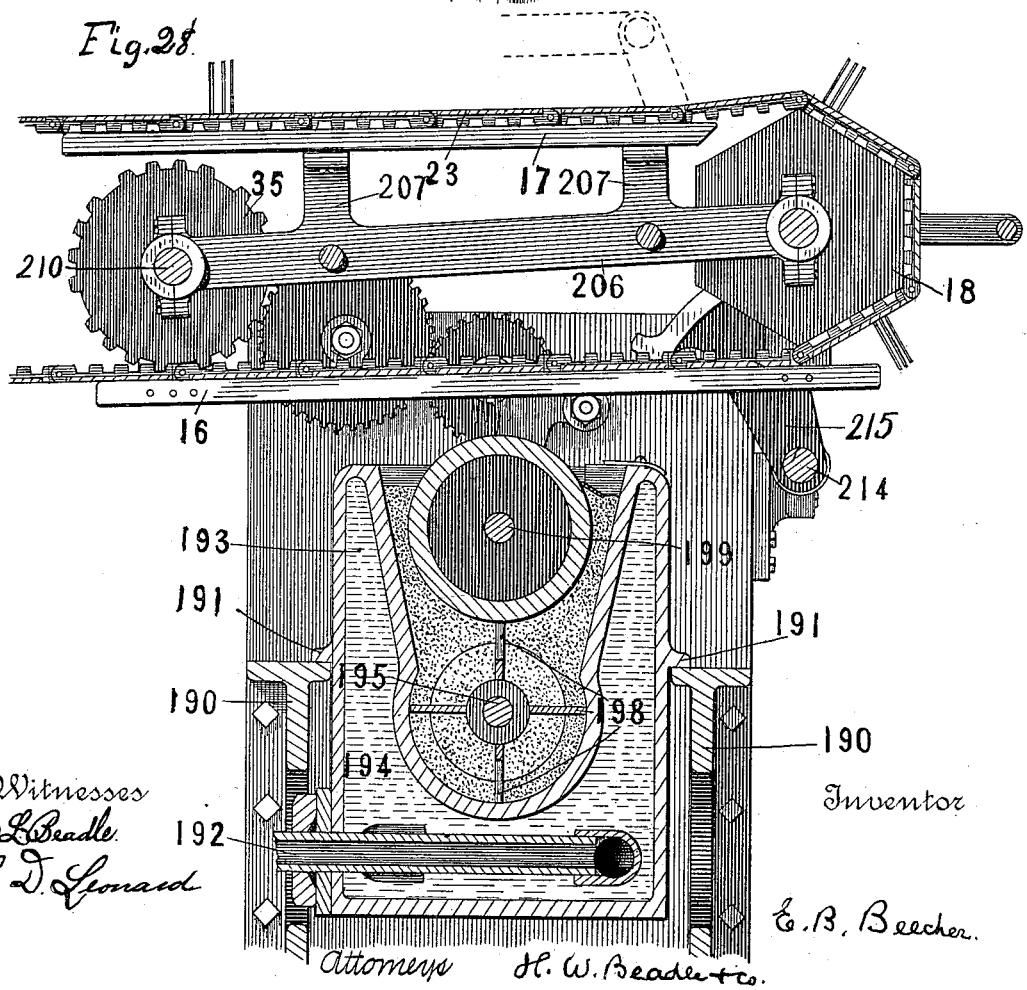
Figure 38:
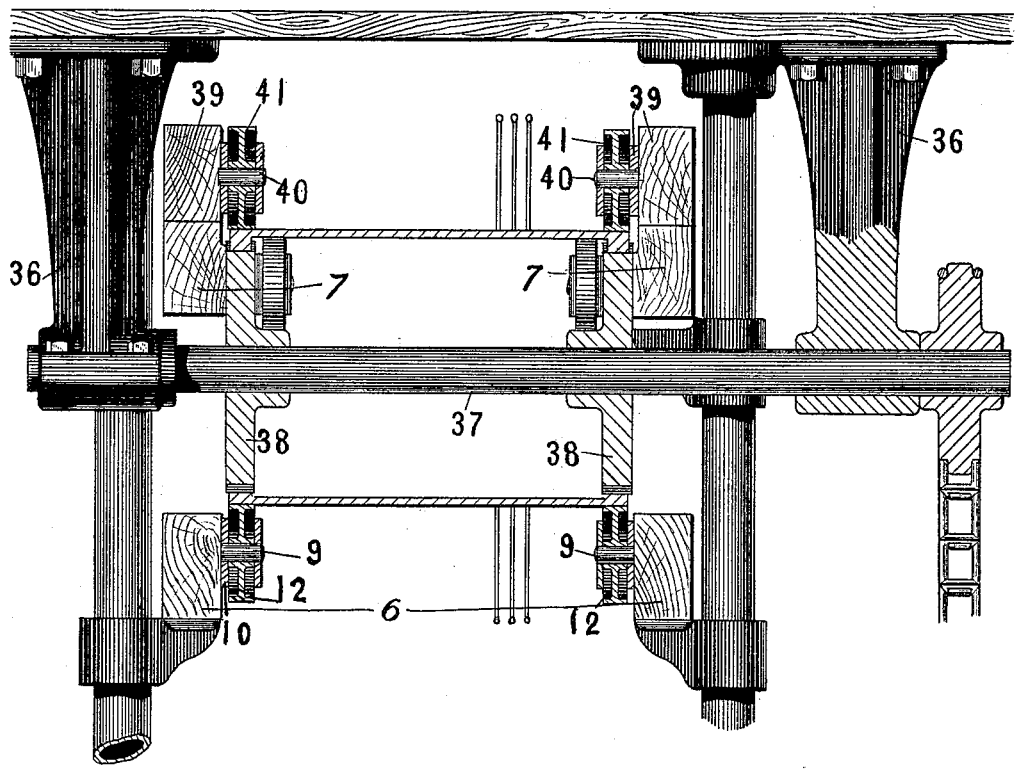
Figure 39:
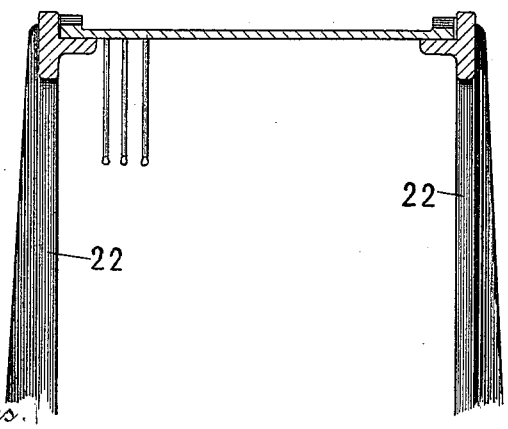
Figure 40:
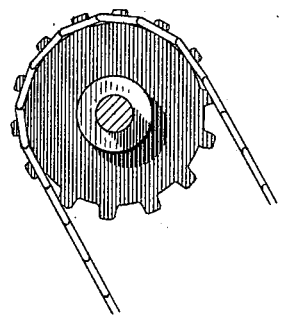
Figure 41:
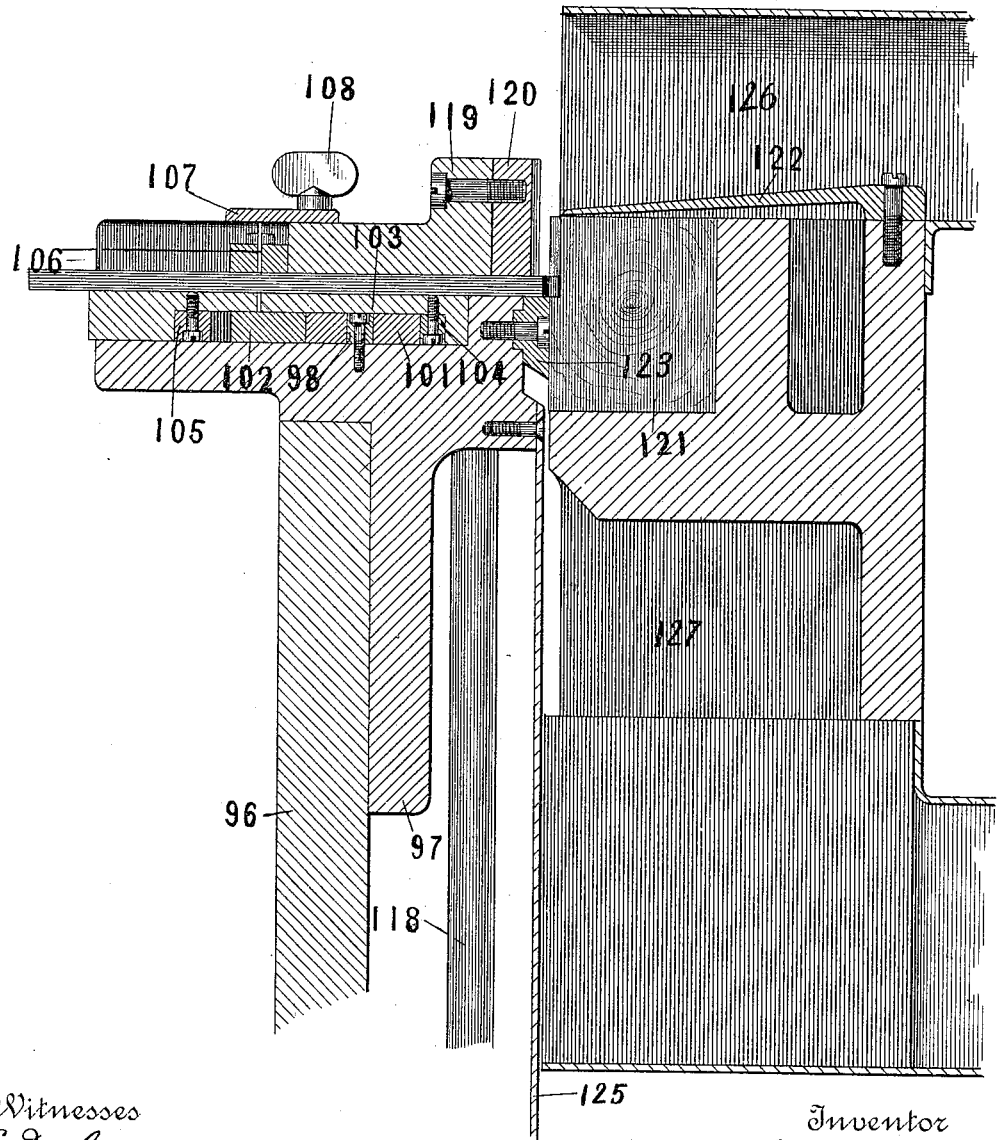
Figure 42:
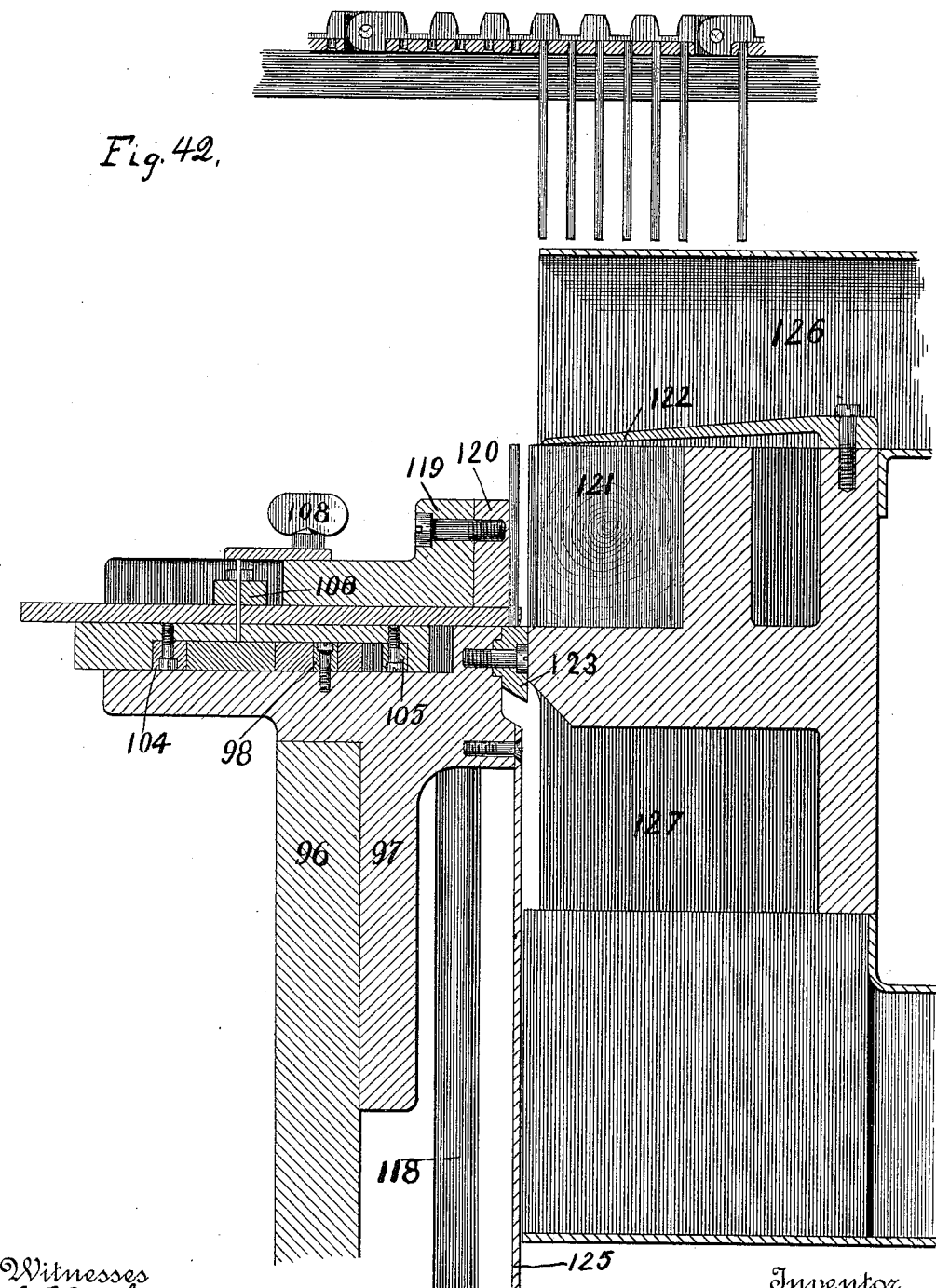
Figure 43:
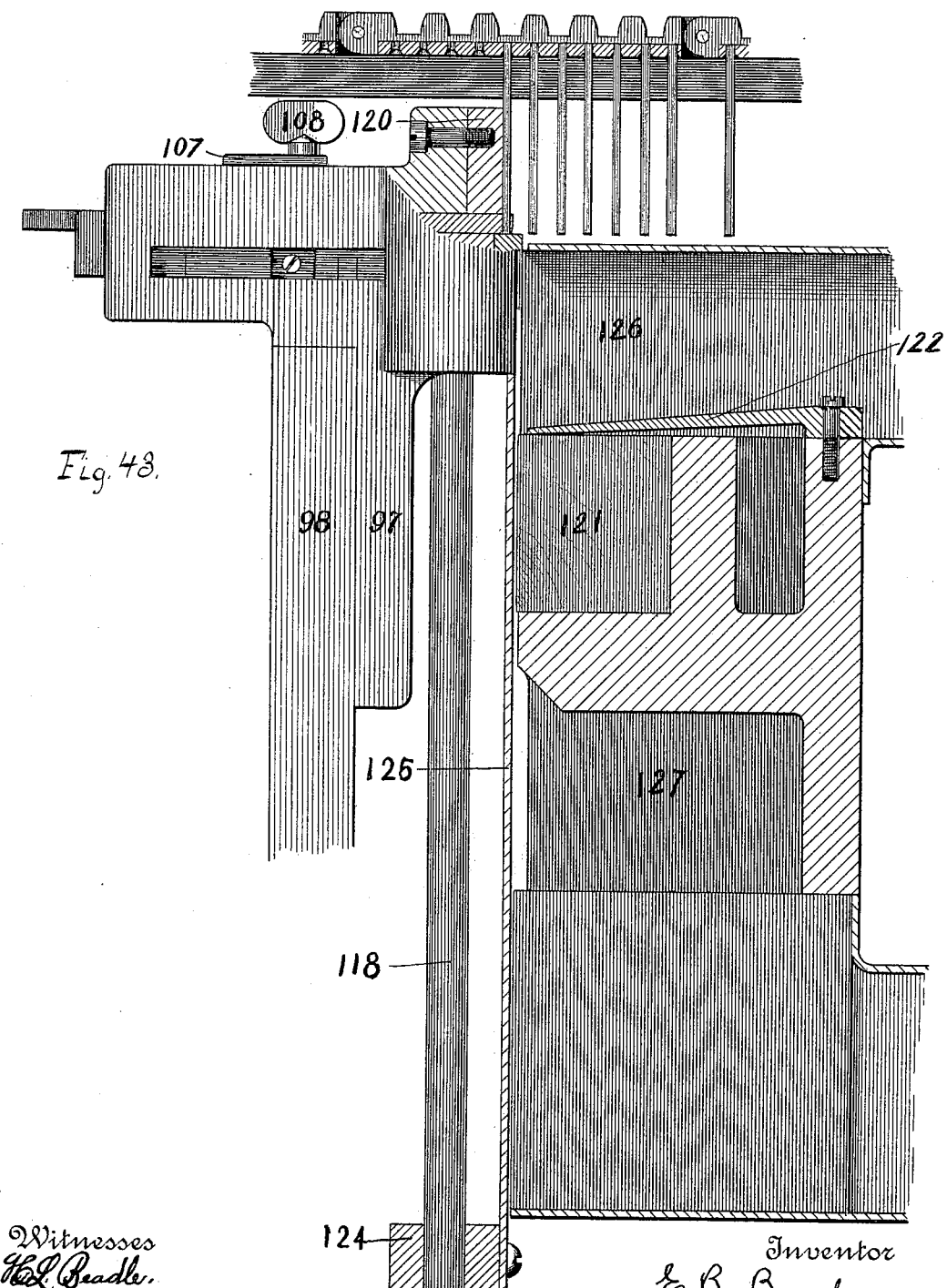
Figure 44:
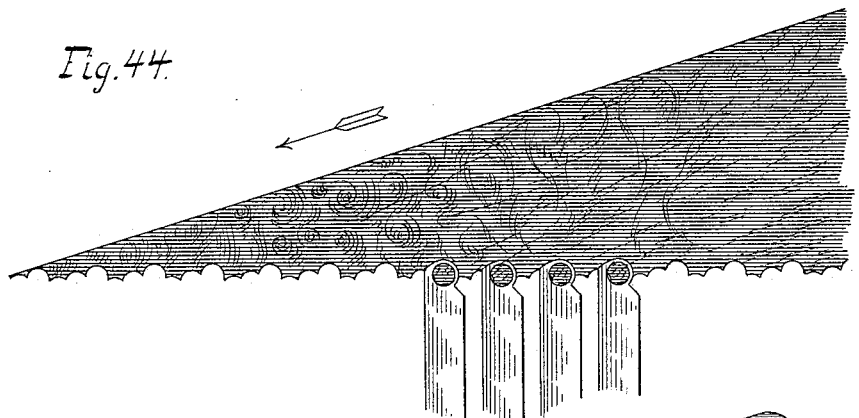
Figure 45:
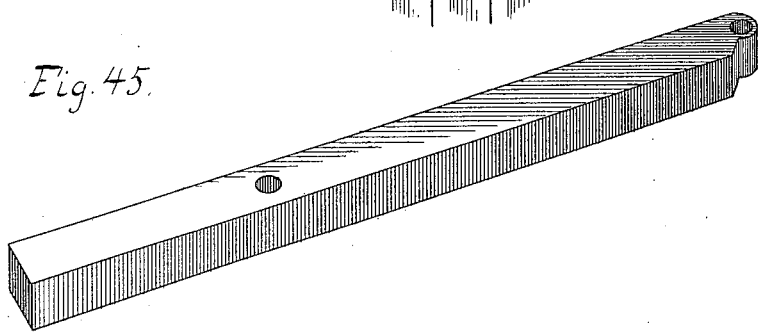
Figure 46:
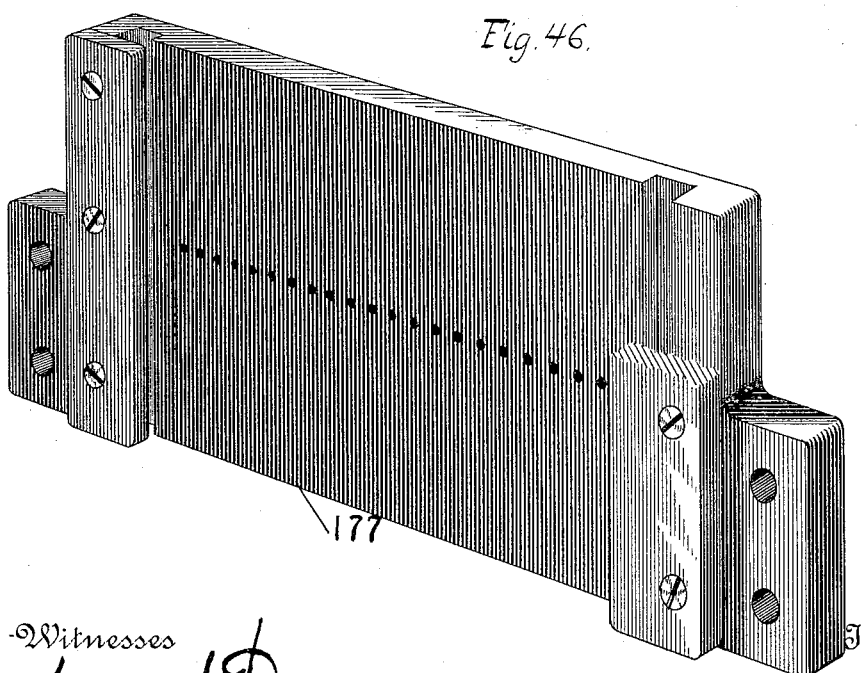
Figure 47:
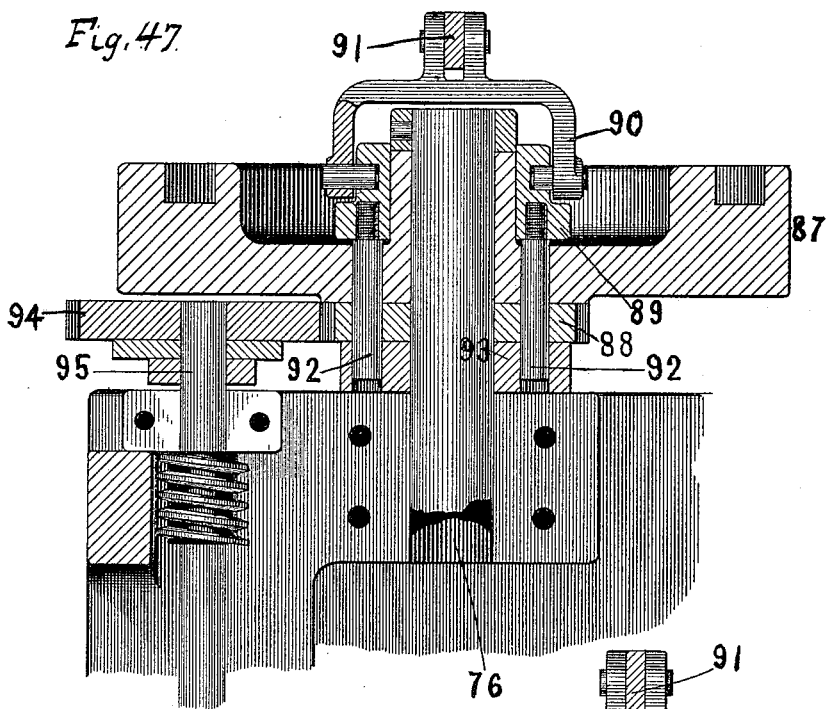
Figure 48:
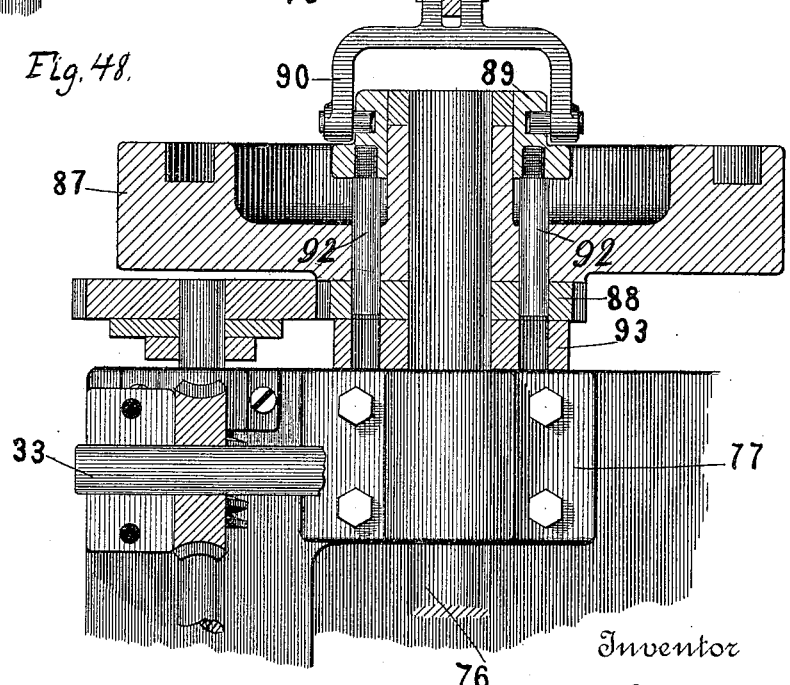
Figure 49:
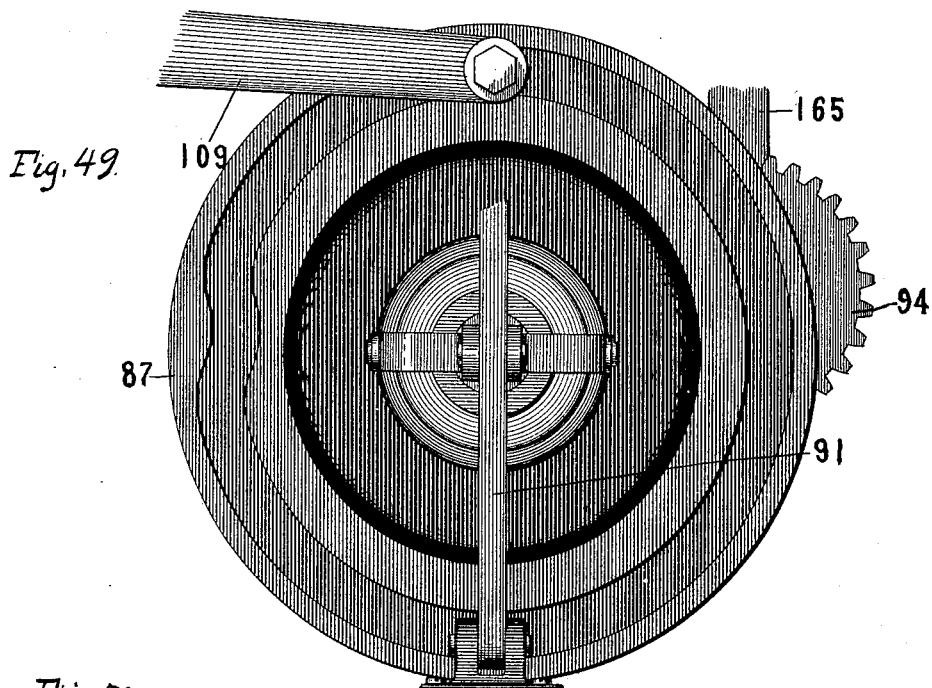
Figure 50:
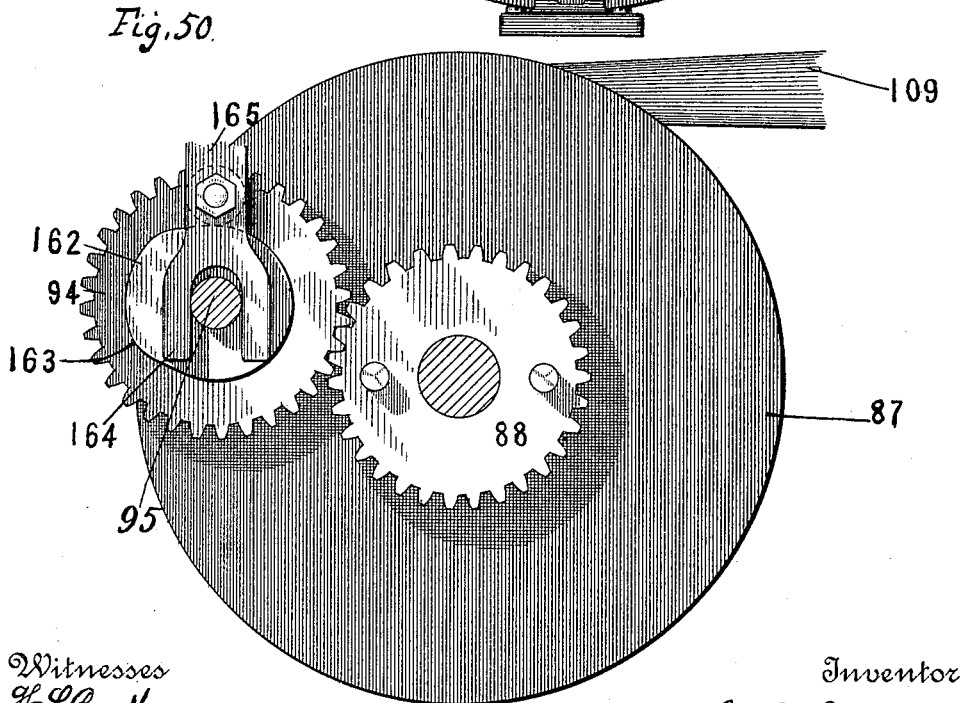
Figure 51:
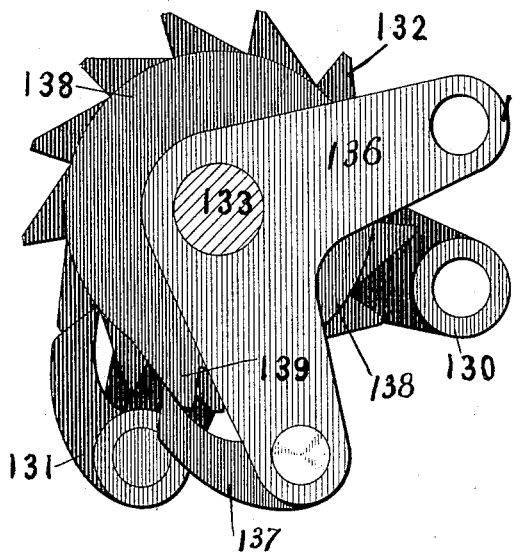
Figure 52:
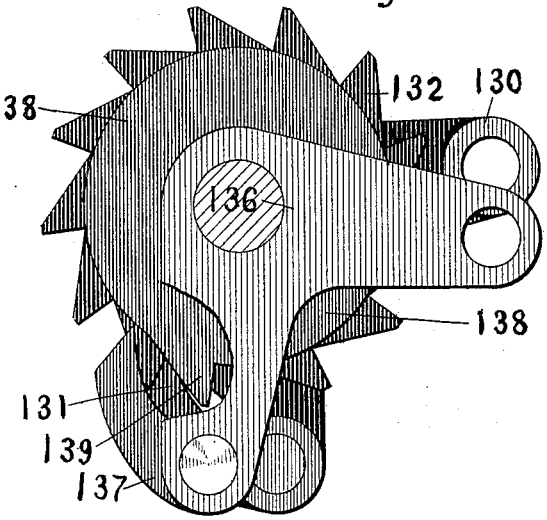
Figure 53:
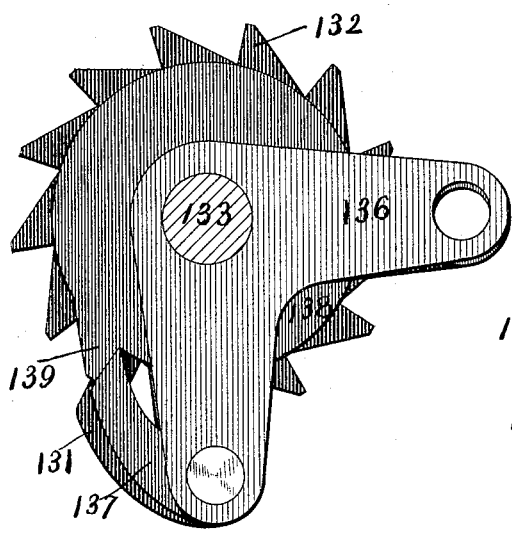
Figure 54:
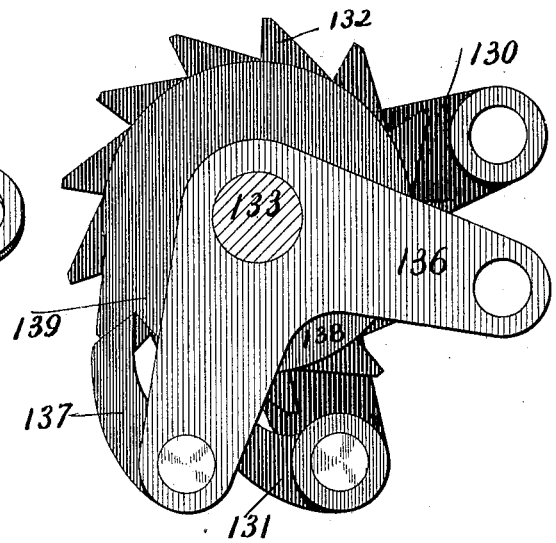
Figure 55:
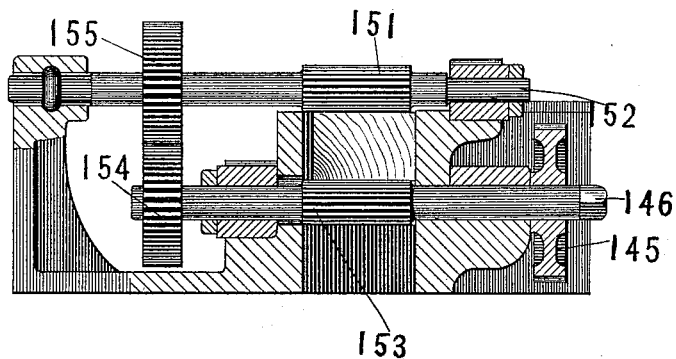
Figure 56:
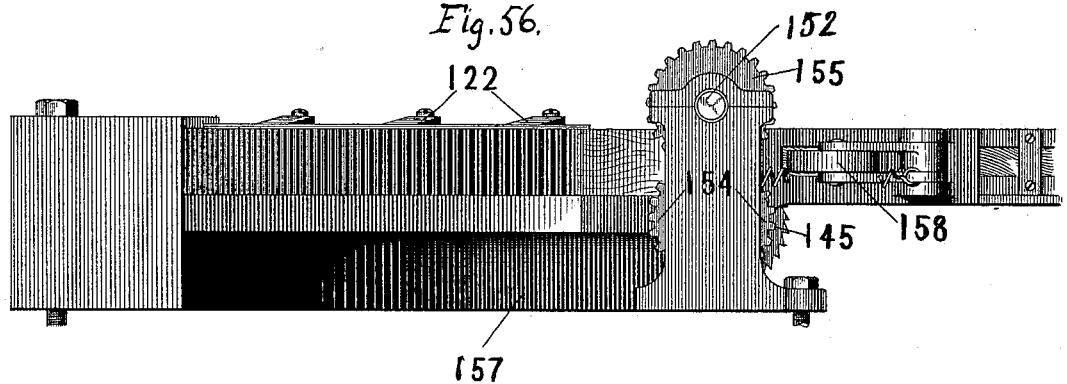
Figure 57:
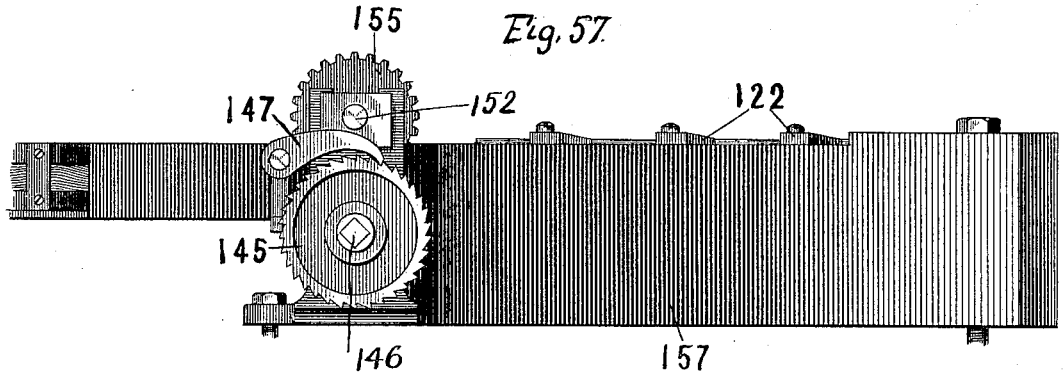

In the drawings, Figure 1 represents a side view of the machine, the endless chain, and the apparatus employed in connection therewith; Figs. 2, 3, 4, and 5, a similar view separated into four divisions for the purpose of showing the parts upon an enlarged scale; Fig. 6, a front view of the machine; Fig. 7, a side view of the machine with the upper portion omitted for the purpose of showing the lower portion upon a larger scale; Figs. 8 and 9, views of the upper portion omitted in Fig. 7; Fig. 10, a top view of the machine. Fig. 11 represents a plan view of that plane of the machine in which the mechanism for feeding the blocks is located; Fig. 11°, a partial view of the mechanism for actuating the ratchet-wheel 146, the wedge-shaped projection 143 being shown in its engaged position; Fig. 11°°, a similar view with the wedge-shaped projection 143 moved into its disengaged position by the action of the handle-bar 149; Fig. 12, a sectional plan view of the bed-plate and the main shaft and the fast and loose pulleys; Figs. 13 and 14, sectional views of the upper portion of the machine; Fig. 15, a vertical section of the lower part of the machine; Fig. 16, a side view of the endless chain; Fig. 17, a sectional view on the line *o o*, Fig. 18; Fig. 18, a top view; Fig. 19, a bottom edge view of the same; Fig. 20, a view of the paraffine-tank and the mechanism for depressing the endless chain to cause the ends of the match-sticks to enter the paraffine-bath; Figs. 21 and 22, a central cross-section of the mechanism for depressing the endless chain and cause the ends of the match-sticks to enter the paraffine-bath; Figs. 23 and 24, end views of the same; Fig. 25, a view of the composition-tank and the swinging frame of the endless chain; Fig. 26, an end view of the composition-tank; Fig. 27, a side view of the swinging frame of the endless chain located on the frame of the composition-tank; Fig. 28, a sectional view of the same, composition-tank also being shown in section; Fig. 29, a sectional plan view of the composition-tank; Figs. 30, 31, and 32, views of the couplings employed in connection with the heating system; Figs. 33, 34, views of the adjustable plate by means of which gear-wheels on the shafts of the composition-roller and the mixing-roller are moved into and out of their engaging position; Fig. 35, a front view of the plane-plate holding the system of gears employed in connection with the composition-tank; Fig. 36, a view of the shaft on which the driver gear-wheel of the system is located; Fig. 37, a side view of the large pulley 19 and parts adjacent thereto; Fig. 38, a sectional view of the endless chain at the point where it passes about the pulleys of the shaft 37; Fig. 39, a partial view of the arms 22 22 of the large pulley 19; Fig. 40, a partial view of the chain-belt; Figs. 41, 42, and 43, operative views of the machine for cutting the match-sticks; Fig. 44, a view illustrating the manner in which the cutters act upon the block; Fig. 45, a perspective view of one of the cutting-knives; Fig. 46, a perspective view of the plate which is employed to resist the thrust of the punches in discharging the completed matches from the machine; Figs. 47 and 48, views of the clutch mechanism employed in connection with the main shaft and loose pulley; Fig. 49, a front view of the loose pulley, the cam-groove, and the lever for operating the match-punch; Fig. 50, a view of the inner face of the pulley with the gear-wheels 88 and 94 and the cam for actuating the mechanism for locking the endless chain; Figs. 51, 52, 53, and 54, views of the mechanism for giving the constant and auxiliary intermittent movement of the endless chain; Figs. 55, 56, and 57, views of the mechanism for feeding the blocks to the cutters; Figs. 58 and 59, views of the mechanism for moving the cutters into and out of action.

To enable others skilled in the art to make and use my invention, I will proceed to describe fully the construction and operation of the same.

For convenience and clearness the description will be given under several heads, as follows: first, the main frame-work and the main beams that support the endless chain; second, the auxiliary supporting parts of the endless chain; third, the pulleys employed for changing the direction of the movement of the endless chain; fourth, the endless chain; fifth, the main and auxiliary mechanisms for driving the endless chain; sixth, the heating system; seventh, the frame-work of the machine; eighth, the fast pulley and the actuating mechanism of the cutter-head; ninth, the loose pulley and the clutch mechanism employed in connection therewith; tenth, the specific mechanism for moving the cutters into and out of action; eleventh, the mechanism for actuating the specific mechanism for moving the cutters into and out of action; twelfth, the cutter-head and cutter; thirteenth, the trimming-knife; fourteenth, the air-blast; fifteenth, the mechanism for giving the constant intermittent movement to the endless chain; sixteenth, the mechanism for giving the auxiliary intermittent movement to the endless chain; seventeenth, the mechanisms for feeding the blocks; eighteenth, the mechanism for locking the endless chain when the cutter-head is inserting a row of match-sticks into the corresponding row of perforations in a plate and when the punches are discharging a row of completed matches from the machine; nineteenth, the mechanism for discharging the completed matches from the plates; twentieth, the paraffine tank and pan; twenty-first, the mechanism for depressing the head ends of the sticks into the paraffine-bath; twenty-second, the composition box and rollers; twenty-third, the swinging frame; twenty-fourth, the mechanism for moving out of action the paraffine-wheel and the composition-roller.

Figure 3:
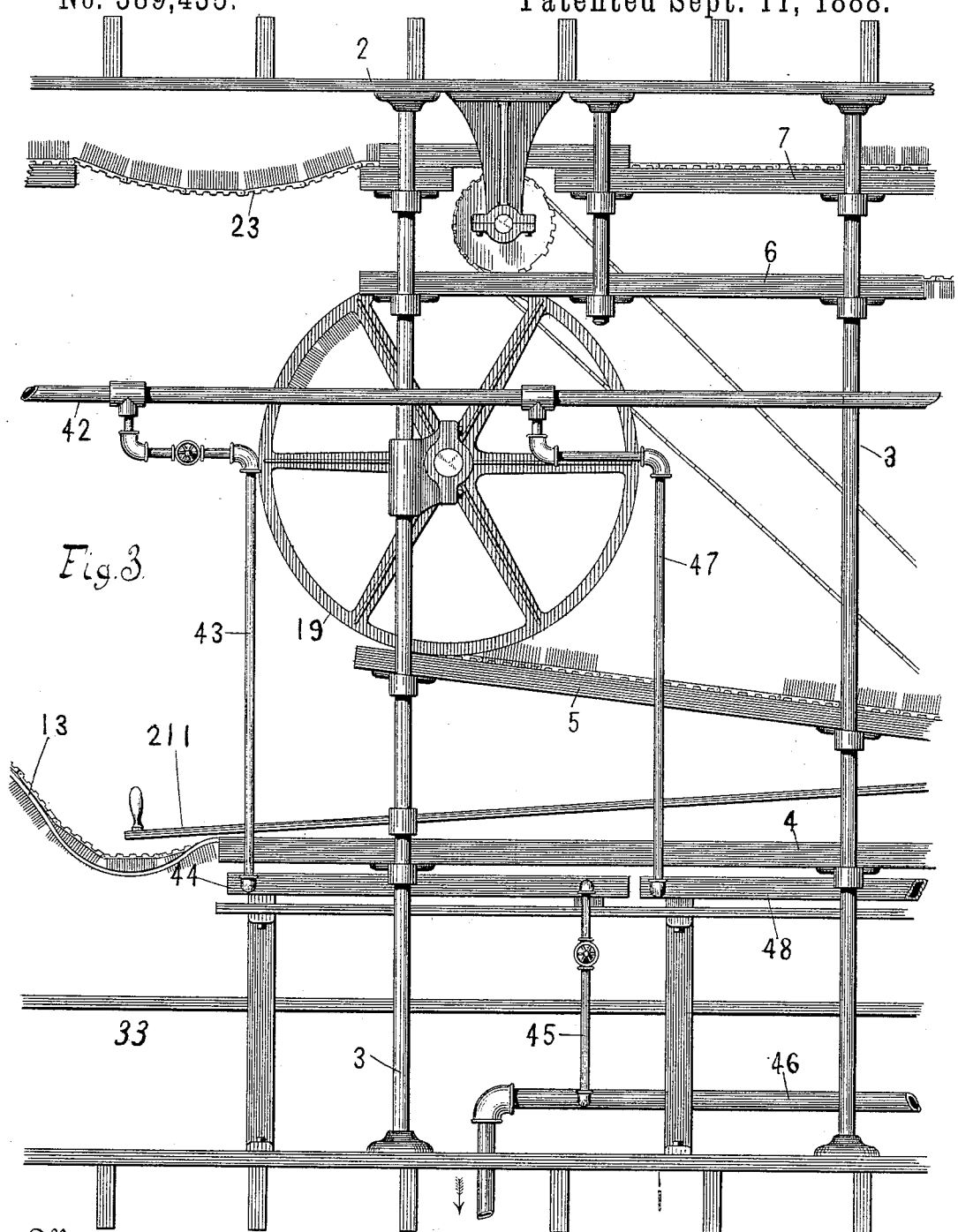
Figure 4:
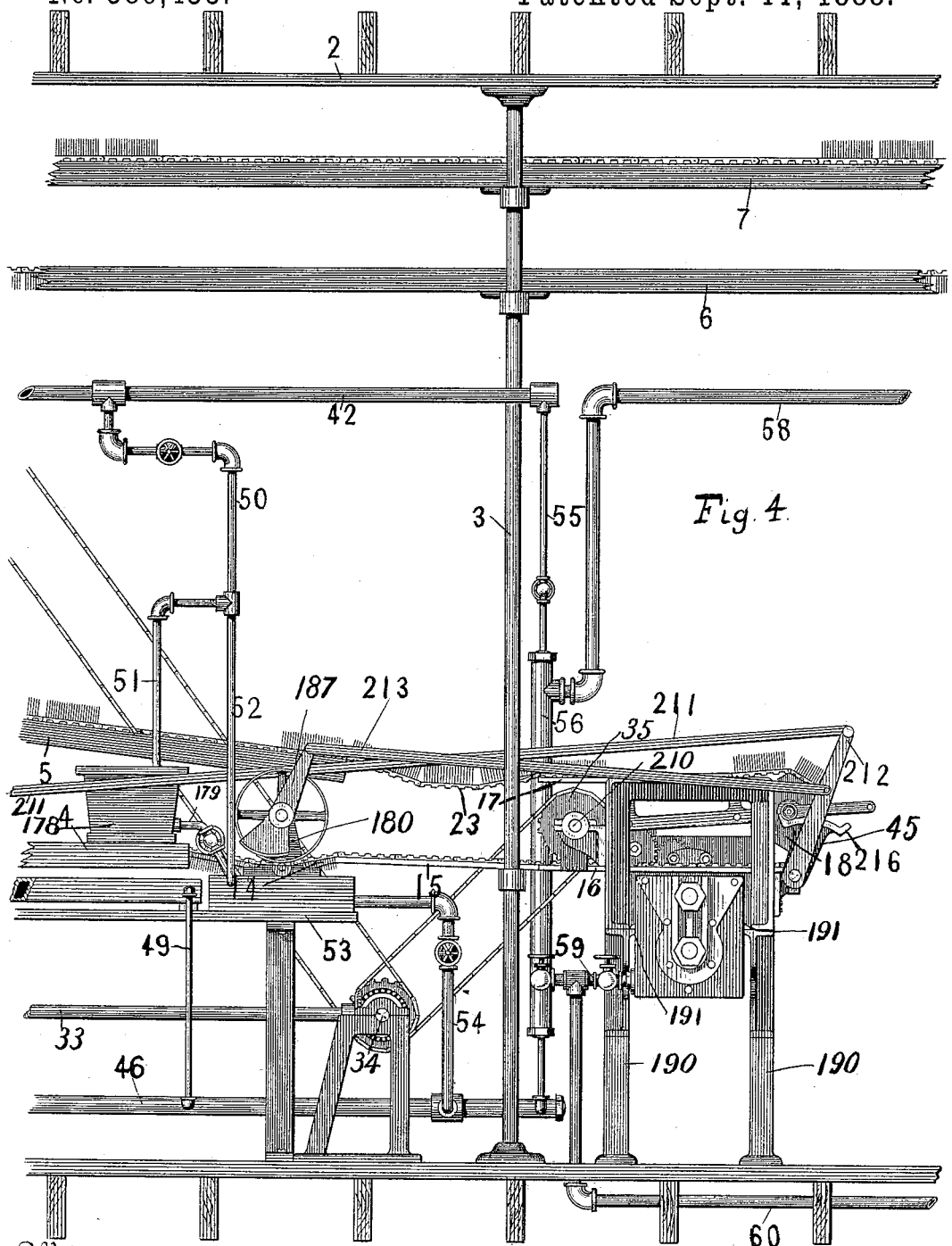
Figure 5:
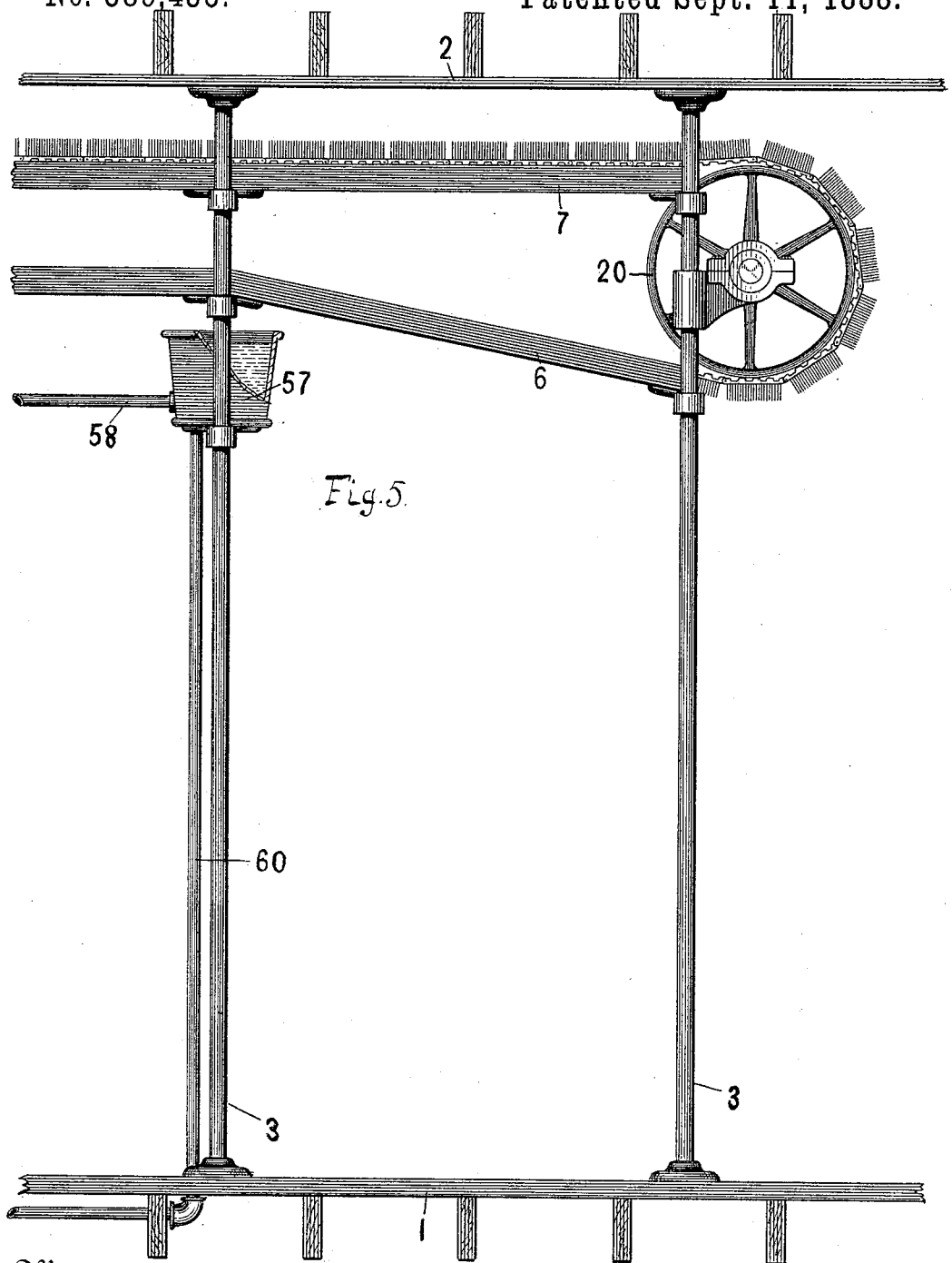

*First, the frame-work and the main beams that support the endless chain.*—1 represents the lower and 2 the upper floor of any suitable room, and 3 3 a series of main supporting-posts. 4 4, Figs. 1, 3, and 4, represent supporting-beams—one on each side of the machine—which are suitably held by the main posts in any proper manner, and are adapted to support properly the endless chain in its movement away from the machine from the curved plate 13, located next the machine to the paraffine-tank. 5 5 represent similar beams, which serve to support the endless chain in its movement toward the machine from a point located above the paraffine-tank to a point located below the large pulley 19, as shown. 6 6, Figs. 1, 3, 4, and 5, represent similar beams, adapted to support the endless chain in its movement away from the machine from a point above the large pulley 19 to a point below the smaller pulley, 20, located at the right-hand end of the machine. 7 7 represent similar beams, adapted to support the endless chain in its movement toward the machine from a point above the smaller pulley, 20, at the right-hand end of the machine to a point above the left-hand end of the beam 6 6. 8 8 represent similar beams, adapted to support the chain in its movement toward the machine from a point located at sufficient distance from the left-hand end of the beams 7 7 to permit a proper amount of slack in the chain to a point over the smaller pulley, 21. These main beams are each provided at proper intervals with studs 9 9, Fig. 20, projecting from the inner sides of the same, upon which are held between the plates 10 and 11 the friction-rollers 12 12, upon which the ends of the plates of the endless chain rest, as shown in Figs. 20 and 38.

*Second, the auxiliary supporting parts of the endless chain.*—13, Fig. 3, represents one of two curved metal bars which extend from the machine to the left-hand ends of the main supporting-beams 4, and serve to support the endless chain in its movement between these points. 14 14, Fig. 20, represent supporting portions on each side of the central space, into which the wheel is depressed for the purpose of causing the match-sticks to dip into the paraffine-tank. 15, Fig. 4, represents the portion between the right-hand end of the right-hand portion 14 and that portion 16, Figs. 27 and 28, which is employed in connection with the movable frame. 17 represents the supporting portion upon the upper side of the movable frame. In addition to these auxiliary supporting parts, the pulleys employed for the purpose of changing the direction of the movement of the endless chain also serve as supporting parts in the manner well understood.

*Third, the pulleys employed for changing the direction of the movement of the endless chain.*—18 represents a hexagonal pulley on the right-hand end of the movable frame, by means of which the direction of the movement of the endless chain, which at this point moves away from the machine, is changed so that it moves toward the machine, as shown. 19, Figs. 3 and 37, represents a large pulley suitably supported in any proper bearings, by means of which the direction of the movement of the chain is again changed, so that it moves away from the machine. 20 represents a pulley located at the right-hand end of the main frame-work, by means of which the direction of the movement of the chain is again changed, so that it moves toward the machine. 21 represents a pulley located at the left-hand end of the frame-work, by means of which the direction of the movement of the chain is again changed for the purpose of leading the same down to the machine, as shown.

The large pulley 19: 19 represents the large pulley, before referred to, located underneath the shaft of the actuating gear-wheels 38 38. 22 22, Fig. 39, represent arms of the pulley, which are adapted to support the plates of the chain, as shown. As this change in the direction of the movement requires the passing of the dipped matches about the wheel with their headed ends projecting inward, it follows that a sufficiently large circumference for the support of the matches in their movement must be furnished to permit the necessary convergence of the matches toward the center of the wheel without the possibility of contact between the adjacent heads of the same. The upper face of the pulley forms a bearing-support at this point for the endless chain, which at this time is positively moved by the actuating gear-wheel toward the right-hand end of the machine upon the supporting-beams 6 6, as shown.

*Fourth, the endless chain.*—23. Figs. 17, 18, and 19, represents the endless chain, which consists of a series of separate plates, 24 24, each of which is provided throughout its entire extent with openings adapted to receive and hold the base ends of the match-stick, which openings are made slightly flaring on that side which receives the base ends of the sticks, in order that these latter may be easily introduced into the openings by the sticking mechanism of the machine, as will be hereinafter described. 25 25 represent gear-teeth projecting from that side of the plate which is opposite to that into which the ends of the match-sticks are introduced. These gear-teeth form practically a rack-bar at each end of the plate, as shown. The plates themselves are properly united together to form what may be termed for convenience an "endless chain" by means of a tongue portion, 26 26, projecting from one edge of the plate, and recessed portions 27 27 upon the other edge of the plate, adapted to take the tongue portions. As shown, a proper pin secures the tongued and recessed portions together in the manner well understood. By means of this construction the gear-teeth of these plates form a continuous flexible rack-bar, with the exception that a vacant space equal to that occupied by a single tooth is left between the plates, as shown. These plates are properly conveyed along upon the supporting parts referred to by means of actuating gear-wheels located at proper points, which are driven directly by the main power and indirectly by auxiliary actuating-wheels located at proper points in the machine, as will be fully described hereinafter.

*Fifth, the main and auxiliary mechanisms for driving the endless chain.*—28, Fig. 8, represents an ordinary gear-wheel, and 29 and 30 ordinary gear-wheels of smaller size engaging therewith, as shown. 31 represents one of two chain-actuating gear-wheels located on the shaft of the ordinary gear-wheel 29, each of which is adapted to engage at this point with the rack-teeth upon one end of the plates of the endless chain. 32 also represents one of two actuating gear-wheels which are located on the shaft of the ordinary gear-wheel 30, each of which is adapted to engage at this point with the rack-teeth upon one end of the plates of the endless chain. The driving mechanism hereinafter referred to is adapted to communicate to the endless chain an intermittent movement, and during each rest interval of the movement a row of match-sticks is inserted in a corresponding row of perforations in one of the stick-holding plates of the endless chain and a row of finished matches is discharged from the machine. 33 repesents a shaft receiving revolution from a worm-wheel, Fig. 48, actuated by a worm, Fig. 47, upon the shaft 95, which shaft 33 extends away from the machine a proper distance and is provided at its right-hand end with a bevel gear-wheel engaging with a similar bevel gear-wheel upon a transverse shaft, 34, which makes connections by means of a chain belt and spur-wheel with a spur-wheel upon the shaft of the actuating gear-wheel 35, as shown in Figs. 27, 28, 36. 36 36, Fig. 38, represent hangers depending from the upper floor, which support the shaft 37 of the actuating gear-wheels 38 38, as shown. The endless chain is given at the machine where the match-sticks are introduced into the perforated plates of the same and the finished matches are discharged therefrom an intermittent movement, as has been before described. At the two other driving-points, however, it is given a continuous movement, the change from continuous to intermittent being permitted by the slack portions of the chain. The actuating gear-wheels bear upon the teeth of the endless chain from above. The actuating gear-wheels 38 38 bear upon one portion of the moving chain from above and act upon another portion from below, the chain being first taken at the left-hand end of the supporting-beams 6, and then, after passing above the smaller pulley, 20, is driven upon the supporting-beams 7 toward the machine. In order that the chain may be held from buckling or rising as it is driven by the upper sides of the actuating gear-wheels 38 38, a special beam, 39, Fig. 38, having a series of studs, 40, with friction-wheels 41 41, is provided, as shown in Fig. 38. By the employment of auxilary actuating-wheels for driving the endless chain at points removed from the main actuating-wheels at the machine the latter are relieved from undue strain.

*Sixth, the heating system.*—42 represents a pipe by means of which steam from any proper point is supplied. 43 represents a branch pipe controlled by a proper cock leading into the hollow heating-plate 44, as shown. 45 represents an exhaust branch pipe, controlled by a proper cock, which leads into the main exhaust-pipe 46, as shown. 47 represents another branch pipe leading into the hollow heating-plate 48, and 49 the exhaust branch pipe leading into the main exhaust 46. 50 represents another branch pipe controlled by a proper cock which is itself divided into two branches, 51 and 52, one branch, 51, of which passes in a coil through the paraffine-tank, as shown, and the other branch of which, 52, extends into the space or jacket 53, surrounding the paraffine-pan, as shown, and then passes off to the main exhaust through a branch pipe, 54, as shown. 55 represents an extension in the main pipe, which is carried in a downward direction and is inclosed by a large tube or jacket, 56. After passing through this tube or jacket it enters the main exhaust 46, as shown. 57, Fig. 5, represents a water-tank, and 58 a water-pipe extending from the same in a horizontal direction, which water-pipe enters the space in the water jacket 56, which space incloses the steam-pipe passing through the same. 59, Fig. 29, represents a branch pipe leading from the water-space of the jacket into the space surrounding the receptacle in which the match composition is mixed and applied to the roller over which the head ends of the match-sticks pass. 60 represents a pipe leading out from this water-space back into the tank through the bottom of the same, as shown. By means of the described system of heating steam can be employed in connection with the hollow heating-plate where high heat is required to dry the match-sticks and prepare the ends of the same to take the paraffine, and hot water can be employed in the treatment of the composition where a low degree of heat is essential. For the purpose of permitting the removal of the box or tank containing the match composition, detachable coupling parts 61 of any proper construction are provided, as shown.

*Seventh, the frame work of the machine.*—62, Figs. 6 and 12, represents the bed-plate of the machine, and 63, Fig. 15, a single central standard rising from the front side of the bed-plate, which standard is provided with a main portion, 64, having a dovetailed recess for holding and guiding the main plate of the cutter-head in its movement, and two auxiliary portions, 65 65, extending at right angles from the main portion, as shown. 66 66, Fig. 12, represent two standards rising from the corners of the bed-plate in the rear side of the same, as shown. 67, 68, 69, and 70, Figs. 7, 11, and 15, and others represent frame-beams which divide the machine into an upper and lower portion and support four vertical standards, 71 71 71 71, Fig. 11, as shown. 72 and 73, Fig. 10, represent upper frame-beams. 74 represents a bridge-bar extending across the top of the machine at the proper point which is adapted to resist the thrust which results from the insertion by the cutter-head of the match-sticks into the openings in the perforated plates of the endless chain. By means of this frame-work and its attendants proper support is afforded for the moving parts.

*Eighth, the fast pulley and the actuating mechanism of the cutter-head.*—75, Figs. 6 and 12, represents a pulley which is rigidly secured to the main shaft 76, Figs. 47 and 48. 77 77 represent the bearings of the main shaft, which are bolted to a raised portion of the bed, as shown in Fig. 12. 78 78, Fig. 12, represent disks located on the main shaft near the center of the same, and 79 a crank-rod uniting the two disks near the edges of the same, as shown in Fig. 15. 80 and 81 represent bearing-blocks, and 82 and 83 connecting-rods, the lower ends of which are rigidly secured to the bearing-blocks 81 and 82 in any proper manner. 84 represents a bearing-block rigidly secured to the cutter-head, and 85 a cap-block inclosing the shaft 86, as shown in Figs. 7 and 15. The upper ends of the connecting-rods extend through these blocks and serve to unite the crank-rod 79 below with the rod 86 above. By means of this specific construction a very rigid connection is made between the parts without interfering with their freedom of movement. By the revolution of the main shaft the cutter-head through this intermediate mechanism is given a reciprocating movement in the manner well understood.

*Ninth, the loose pulley and the clutch mechanism employed in connection therewith.*—87, Figs. 6, 12, 47, 48, 49, and 50, represents a loose pulley having its bearing on the end of the main shaft 76, as shown. 88, Figs. 47, 48, 49, and 50, represents a gear-wheel rigidly attached to the inner face of the pulley and forming practically a solid portion of the same. 89 represents a sleeve which is adapted to revolve with the pulley, but is capable of independent movement in a longitudinal direction. 90 represents a bail having pins adapted to extend into a groove in the sleeve 89, and also ears adapted to hold the lever 91, which lever is pivoted on the bed 62, as shown in Fig. 6. 92 92 represent long pins rigidly secured to the sleeve 89 and projecting therefrom in lines parallel with the main shaft, as shown. 93 represents a collar rigidly secured to the main shaft in any proper manner, which is provided with openings adapted to receive the pins 92 92, as shown. 94 represents a gear-wheel upon the shaft 95, which engages with the gear 88 on the face of the pulley.

The operation is as follows: When the lever 91 is actuated to move in the bail 90 with the pins 92 92, and thereby cause their entrance into the collar 93, as shown in Fig. 47, the loose pulley 87 is clutched to the main shaft, and consequently communicates movement thereto. As the gear-wheel 94 is engaged with the gear-wheel 88, the shaft 95 is also given revolution. When the loose pulley is thus clutched to the collar, all the moving parts of the machine are put in action. For the purpose of avoiding strain at this time, movement is communicated to the first pulley by an independent belt. When it is desired to run the machine without the action of the cutters, the lever 91 is actuated to withdraw the pins, as shown in Fig. 48, from their engaging position. Motion is then communicated from the loose pulley and gear-wheel 88 to the gear-wheel 94, the shaft 95, and the parts actuated thereby.

*Tenth, the specific mechanism for moving the cutters into and out of action.*—96, Fig. 41, represents the main plate of the cutter-head, which is adapted to slide in the dovetailed recess of the plate 64, Fig. 12, before referred to. 97 represents a head portion proper. 98, Fig. 58, represents a bar rigidly attached to the head portion, as shown in Fig. 41, which bar is provided upon one side with cam-surfaces, as shown. 99 represents a similar bar with similar cam-surfaces, as shown. 100 represents a screw, by means of which the bar 99 may be adjusted relatively to the bar 98 for the purpose of changing the base-lines, when desired, upon which the sliding parts move. When these bars are properly adjusted, they form practically a single fixed bar, which serves as a base for the sliding parts. 101 and 102 represent bars united together by cross-pieces in such manner as to move together as a single piece, each being provided on the side next the fixed bars 98 99 with straight surfaces adapted to slide on the adjacent surfaces of the compound bar, as shown. The outer edges of these bars are provided with cam-surfaces, as shown. 103 represents a grooved socket-plate adapted to hold the shanks of the cutters, each of these being rigidly secured in place by a central pin, as shown. 104 and 105 represent bars rigidly secured to the under side of the socket-plate 103, which bars are provided on the side next to the bars 101 and 102 with cam-surfaces, as shown. 106, Fig. 41, represents a pin the lower end of which rests on the upper surface of one of the sliding bars, and the upper end of which bears against a plate, 107, which is secured in position by a set-screw, 108. By means of this construction sufficient pressure is caused to bear upon the sliding bar to prevent the accidental movement of the same.

The specific operation of this machine is as follows: At the proper time in the operation of the machine the bars 101 and 102 are given, by an actuating mechanism hereinafter described, a longitudinal movement in one direction to move the knives out into their cutting position and in the other direction to return them, this result being accomplished by the movement of the cam-surfaces of the sliding bars 101 and 102 on the cam-surfaces of the bars 104 and 105. In consequence of this action the longitudinal movement of the bars 101 and 102 causes the lateral movement of the bars 104 and 105, to which bars the socket-plate 103, carrying the knives, is attached.

*Eleventh, the mechanism for actuating the specific mechanism which moves the cutters into and out of action.*—109 109 represent lever-arms extending from the rock-shaft 110 to a cam on the fast and loose pulleys, as shown in Fig. 49. 111, Fig. 15, represents an arm extending in a vertical direction from the rock shaft 110 and making connection at its upper end with a cross-rod, 112, Figs. 11 and 15. 113, Figs. 11 and 15, represents a vertical shaft having the arms 114 and 115, Fig. 15, having their ends united by a square bar, 116, which bar is adapted to be held by the cross-pieces of the bars 101 and 102, as shown in Fig. 58.

The operation is as follows: The shaft 110, by means of the lever-arms 109 109 and the cam-surfaces, before referred to, is given a rocking movement, and this movement is communicated at its upper end to the cross-rod 112. The movement of the cross-rod is communicated by means of a proper arm, Fig. 11, to the vertical shaft 113, and the square bar held by the arms of this rock-shaft gives a reciprocating movement to the bars 101 and 102, and consequently causes the moving of the cutters into and out of action at the proper time, as has been before described.

*Twelfth, the cutter-head and cutter.*—117, Fig. 6, represents a stud secured to the main plate of the cutter-head in any proper manner, which is provided with an opening adapted to receive the rod 118, the upper end of which rod bears against an overhanging portion of the cutter-head and serves to support the same, as shown in Figs. 6 and 41. A similar stud and rod is employed on the opposite side of the cutter-head, as shown in Fig. 6. 97 represents the head portion before referred to; 119, a right-angled block located above the cutters, as shown. 120 represents a face-block rigidly secured to block 119, which is provided with a series of grooves adapted to support the match-sticks when cut, as shown in Figs. 42 and 43. 121 represents the block held in the feeding box or trough, as shown in Fig. 41; and 122, a portion of a spring-plate which bears upon the top of the block for the purpose of maintaining it in its proper position, as shown in Fig. 11. The specific construction of each individual cutter is shown in Fig. 45, and the specific operation of the cutter upon the block in Fig. 44.

The operation is as follows: The cutter-head being in its upper position and the cutters having been moved out into the cutting position, the cutter-head is caused to descend and cut the sticks from a block, as shown in Fig. 41. The cutting action having been performed, the cutters are drawn away from the block, and the base of the cutter consequently is brought into position over the solid block, which is employed to hold the trimming-knife, as shown in Fig. 42. The cutter-head is then carried upward to insert the new row of sticks into the perforated plate of the endless chain, as shown in Fig. 43. In order to resist the thrust action of the cutter-head in inserting the match-sticks, the bridge-bar 74, Figs. 10 and 13, is employed, the same being provided with a pendent arm having a bearing-face located directly over the point where the match-sticks are inserted into the chain, as shown in Figs. 13 and 14.

*Thirteenth, the trimming-knife.*—123, Fig. 42, represents a trimming-knife rigidly secured to the cutter-head by means of a block and screw, as shown, which knife is adapted to trim or slice off from the face of the block in advance of the cutters any projecting uncut portions which may have been left in the previous descent of the cutters.

*Fourteenth, the air-blast.*—124, Fig. 43, represents a block on the stay-rod 118, and 125 represents a plate rigidly secured to the same, the upper end of which plate is secured to the cutter-head, as shown in Figs. 41 and 42. 126, Fig. 15, represents a pipe having an opening for exhaust in line below the row of matchsticks. 127 represents another pipe having an opening for exhaust in a line below the plane of the cutters. In the upward movement of the cutter-head the opening into the lower pipe is closed. The purpose of the upper pipe is to carry off any imperfect sticks, &c., that may not be properly held in the perforated plate. The purpose of the lower pipe is to remove any waste that may result from the action of the cutting.

*Fifteenth, the driver mechanism for giving the constant intermittent movement to the endless chain.*—128, Figs. 6 and 12, represents an eccentric upon one end of the shaft 95, and 129, Fig. 6, a rod extending upward from the same, the upper end of which is attached to the arm of the bell-crank lever 130, Figs. 51, 52, 53, and 54. 131 represents a pawl attached to the other arm of the lever 130. 132 represents a ratchet-wheel rigidly attached to the stud 133, Figs. 8 and 10, upon which is located a pinion engaging with the ordinary gear-wheel 29, which wheel has upon its shaft also the actuating gear-wheel 31 for the endless chain, as shown in Figs. 8 and 10. By the reciprocation of this mechanism the ratchet-wheel is caused to communicate, through the intermediate mechanism described, an intermittent movement to the endless chain equaling in length the normal distance that it is proper for the chain to move—that is, the distance between adjacent rows of perforations. As the distance between adjacent plates is twice as long as the normal distance, auxiliary mechanism is required to compensate for this, as will now be described.

*Sixteenth, the mechanism for giving the auxiliary movement to the endless chain.*—134, Figs. 6 and 12, represents an eccentric on the shaft 95, which is set in such manner that the throw of its actuating-rod 135 is made in an opposite direction to the actuating-rod 129. 136, Figs. 51, 52, 53, and 54, represents a bell-crank lever having the pawl 137, and 138 represents a disk secured to the ratchet-wheel 132, which disk has a single tooth, 139, located between two teeth of the ratchet-wheel, as shown.

The operation is as follows: By the reciprocation of the actuating-rod 135 the bell-crank lever attached thereto is moved with each impulse of the rod, but no result whatever follows this action until by the continued revolution of the ratchet-wheel the one tooth of the disk is brought within the range of action of its pawl, when the ratchet-wheel will be moved thereby in the manner understood. The auxiliary movement imparted to the chain by this action occurs after the chain has been moved the normal distance by the pawl 131. The auxiliary movement then, with the normal movement, imparts to the chain a movement equaling the distance between two adjacent plates. From this it follows that the rows of perforations will be presented successively to the action of the mechanism for inserting the match sticks and discharging the completed matches without regard to the open space between the plates.

*Seventeenth, the mechanisms for feeding the blocks.*—140, Figs. 7 and 12, represents a lever which at one end is pivoted to the bed-plate in any proper manner, and at the other is caused to rest upon a cam upon the main shaft, any proper spring being employed to keep the bearing end of the lever in contact with the cam, as shown in Fig. 7. 141, Fig. 11°, Fig. 11°°, represents a vertical bar rising from the lever near the center of the same, which bar is itself pivoted at its lower end, as shown in Figs. 7 and 12. 142, Fig. 11°°, represents a socket-piece on the upper end of the standard, and 143 a wedge-shaped projection having a shank portion extending into the socket-piece and capable of adjustment therein by means of a set-screw, 144, as shown. 145, Figs. 11, 55, 56, and 57, represents a ratchet-wheel held on one end of the shaft 146, as shown in Figs. 11, 11°, 11°°, and 55. 147 represents a retaining-pawl to prevent the retrograde movement of the ratchet-wheel. 148 represents a spring by means of which when the same is free to act the bearing-point of the wedge-shaped piece is kept in contact with the ratchet-wheel. 149 represents a handle-bar, having the pin 150 located thereon, which handle-bar is adapted, when so moved as to bring its pin into contact with the vertical bar 141, to move the wedge-piece from its engaged position shown in Fig. 11° into its disengaged position shown in Fig. 11°°. 151, Fig. 55, represents a corrugated roller upon the auxiliary shaft 152 above the line of blocks, and 153 a corrugated roller on a shaft, 146, as shown, having the ratchet-wheels. 154 represents a gear-wheel on the end of the shaft 146 opposite that end of the shaft on which the ratchet-wheel is located, and 155 a gear-wheel on the auxiliary shaft 152, engaging therewith, this construction being employed for the purpose of obtaining a simultaneous movement of the corrugated feeding-rollers. 156, Fig. 11, represents a bell-crank lever pivoted in any proper support on the side of the box or trough 157, in which the blocks are held. 158 represents a roller on one arm of the lever 156, which is adapted to press through a proper opening in the side of the box upon the blocks as they are moved along for the purpose of forcing them over against the guiding-wall of the box, as shown. 159, Fig. 11, represents a spring, by means of which the proper pressure is exerted. 160 represents a follower plate or frame having cords attached to the ends of the same, which pass about the pulleys 161 161, and up over other pulleys located in any proper point and sustain at their ends a weight, the purpose of this construction being constantly to advance a line of blocks to the corrugated feeding-rollers. When it is desired to place the block in the box, the follower-plate is drawn back by the hand against the resistance of the weights.

The operation is as follows: At each downward movement of the vertical bar the ratchet-wheel is moved one step by the wedge-piece, and this movement is communicated through the corrugated feeding-rollers to the block. The blocks are fed to the cutters, it will be observed, on a diagonal line.

*Eighteenth, the mechanism for locking the endless chain when the cutter-head is inserting a row of match sticks into a corresponding row of perforations in a plate and when the punch is discharging a row of completed matches from the machine.*—162, Fig. 50, represents a cam having the bearing-surface 163. 164, Figs. 6, 7, and 9, represents the forked end of an actuating-rod, 165, the upper end of which is secured to the rocking lever 166, having at one end a tooth adapted to engage with one of the recesses of the ratchet-wheel 167, and at the other end also with a tooth adapted to extend into one of the recesses of the ratchet-wheel 168. 169 represents a retaining-pawl, by means of which the retrograde movement of the ratchet-wheel 168 is prevented.

The operation is as follows: By the action of the cam 162 at the proper time in the operation of the machine the actuating-rod 165 is given an upward movement, and consequently one tooth is caused to engage with the ratchet-wheel 167 and the other tooth with the ratchet-wheel 168. These ratchet-wheels, it will be observed, are located at the points where the match-sticks are entered into and the completed matches are discharged from the machine, the plates at this time being rigidly held in their registering positions.

*Nineteenth, the mechanism for discharging the completed matches from the plate.*—170, Figs. 7 and 12, represents a lever-arm united with the arm 109 and receiving movement from the same, secured to the rock-shaft 110, which arm is provided with an actuating-rod, 171, the upper end of which is attached to an arm, 172, of the rock-shaft 173, Figs. 8 and 9. 174 represents an arm on the rock-shaft 173, which extends in an upward direction, and is secured at its upper end to the cross-rod 175. 176 represents the back plate of a frame of any proper construction, which is rigidly secured to the end of the rod 175, as shown. To the front plate of the frame is attached a single row of punches, which are adapted to eject from the machine at the proper time a single row of completed matches. 177, Figs. 13, 14, and 46, represents a plate having a single row of openings, as shown in Fig. 46, which openings are arranged in proper line with the punches, as shown. A perforated plate holding the completed matches is advanced by the proper mechanism for the purpose in such manner that each row of perforations is successively brought into position before the row of openings in the plate 177. The perforated plate itself at this time is rigidly held against backward movement by the engagement of its ends with the recesses of the plate 177. At this time also the perforated plate is held against movement by the mechanism which locks the endless chain. The perforated plate being thus rigidly held in accurate registering position, the punches are advanced through the openings in the plate 177 and through the perforations of the match-holding plate, and are thereby caused to discharge the matches therefrom.

*Twentieth, the paraffine tank and pan.*—178, Fig. 20, represents a tank located at any proper point on the line of the endless chain, which is constructed, generally, in any proper manner, but is open above to permit the introduction of the paraffine in a solid form. 51, Fig. 4, represents a branch pipe leading from the main steam-pipe through a coil on the bottom of the tank to any proper point of discharge. That portion of the coil which is contained in the tank is shown in Fig. 20, but the discharge end of the same is not shown. 179 represents a pipe controlled by a proper cock which leads out from the tank near the bottom of the same and terminates above the paraffine-pan, as shown. 53, Figs. 4 and 20, represents a chamber or jacket about the pan, into which leads the branch steam pipe 52, Fig. 4, and 54, Figs. 4 and 20, the discharge-pipe leading out therefrom into the main exhaust, as shown. By means of the described construction a supply of melted paraffine may be kept in the tank and be delivered to the pan as it is needed, the contents of the tank and pan both being subjected to heat in the manner well understood.

*Twenty first, the mechanism for depressing the head ends of the sticks into the paraffine bath.*—180 180 represent vertical standards, one on each side of the line of the endless chain, which are supported upon any proper base portions and are adapted at their upper ends to guide the boxes 181 181 of the shaft 182 in their vertical movements, Figs. 23 and 24. 183 represents a wheel located near the center of the shaft, as shown. 184 represents an arm on one end of the shaft, which is provided above with a journal-bearing and at its lower end with a plate portion having a cam-surface, 185, as shown. 186 represents a fixed stud or pin pivoted with a friction-roller, which stud or pin is located at the proper point upon the base portion to furnish a proper bearing for the cam surface, as shown. 187 represents a lever the journal-bearing of which is rigidly attached to the journal-bearing of the arm 184. 188 represents a hub portion held upon the shaft, which is provided with a downwardly-extending arm or bar, 189, having at its lower end a pin provided with a friction-roller, as shown. The relation of the parts is such that the friction-roller supported by the bar 189 and hub 188 upon the shaft 182 is in position below the lower surface of the endless chain. In consequence of this construction it follows that when the shaft is raised the friction-roller will cause also the raising of the endless chain. The supporting surfaces of the endless chain are interrupted or broken at the paraffine-pan, an open space being left between the portions 14 14, as shown in Fig. 20. The endless chain, consequently, when passing the paraffine-pan, is left without support, and a certain portion of its length may be depressed by the action of the wheel to cause the head ends of the match sticks to enter the paraffine-bath.

The operation is substantially as follows: When it is desired to immerse the ends of the sticks in the paraffine-bath, the parts are caused to occupy the position shown in Figs. 20, 21, and 23. In this position the upper end of the lever is swung over to the right, as shown in Fig. 23, and the cam-surface of the plate portion consequently is moved over into its left-hand position relative to the fixed stud 186. In this position the bearing-boxes 184, the shaft, and the wheel are permitted to descend into their lowest positions, and consequently the match sticks are immersed in the bath. When it is desired to pass the pan without causing the match-sticks to enter the paraffine-bath, the parts are moved into the position shown in Figs. 22 and 24. In this position the bearing-boxes, the shaft, and the pulley are held in their highest positions, and consequently the chain is permitted to pass the paraffine-pan in a straight line. When the actuating parts are lifted, the chain is also lifted by the pin and roller upon the bar 189.

*Twenty-second, the composition box and roller.*— 190 190, Fig. 28, represent supporting-surfaces, one upon each side, which extend upward from any proper foundation portion, and are each provided above with a bearing surface adapted to support the flange 191 191 on each side of the box, as shown. 192, Figs. 28 and 29, represents a coil of pipe located on the bottom of the box, and 193 a chamber surrounding the tank portion, which is adapted to receive hot-water from the pipes 59 and 60 of the heating system before described. 194, Fig. 28, represents the tank portion proper, in which the composition is mixed and by means of the composition-rollers applied to the match-sticks in the manner well understood. 195 represents a shaft held in proper bearings on the sides of the box, as shown in Fig. 29, one end of which extends through a proper stuffing-box, and by means of a composition-box, 196, receives movement from the gear-wheel 197. 198 198, Figs. 28 and 29, represent blades secured to the shaft in any proper manner, which blades are provided with spaces or openings, the spaces or openings in one blade being opposite to the solid portions in the other, as shown in Fig. 29, this construction being employed to insure the thorough mixing of the composition. The outer edges of these blades are adapted, also, to sweep the entire surface of the cylindrical portion of the tank, in order that no portion of the composition may be left unstirred at the bottom of the tank. 199, Fig. 28, represents a shaft held by proper bearings in the sides of the box, upon which is located the composition-roller, which shaft is provided on one end of the same, outside of the box, with a gear-wheel, 200, engaging with the gear-wheel 197, as shown in Fig. 35. The gear-wheels 197 and 200 receive movement through the intermediate gear-wheels, 291 and 202, from the gear-wheel 203 on the shaft 210 of the actuating gear-wheel 35, as shown in Fig. 27. The intermediate gear wheel, 201, has its journal-bearing held in a plate, 204, Figs. 33 and 34, upon the shaft of the composition-roller, which plate is provided with a slot, 205, as shown. By means of this specific construction the composition-roller and the mixing shaft may be moved out of action by simply swinging the plate 204 in a proper direction to remove its gear-wheel 202. The general construction of the parts is such that the tank may be removed when desired by unscrewing the coupling-joints of the heating system and sliding the same endwise upon its supporting-surfaces. By means of the arrangement of the parts described the direction of the movement of the endless chain is changed immediately after the composition is applied to the ends of the sticks, so that instead of hanging with heads downward they stand in an upright position. In consequence of the action the soft composition is caused to assume a round form instead of one that is elongated.

*Twenty-third, the swinging frame.*—16, Figs. 27 and 28, represents the lower supporting-surface for the endless chain of the movable or swinging frame, and 17 the upper supporting-surface of the same. 206 represents a central bar pivoted at one end upon the shaft 210, Fig. 25, of the actuating gear-wheels 35 35, and secured at the other to the shaft of the hexagonal pulley 18, as shown. 207 207 represent arms extending from the central bar, 206, to the upper supporting-surface, 17, and 208 208 arms extending from the central bar to the lower surface, as shown in Figs. 25 and 27. 209 represents a bracket upon one side of the box, and 210 a shaft held thereby, on which one end of the central bar, 206, of the swinging frame is journaled. By means of this construction it is possible to swing the frame up out of the way, as shown in Fig. 25, when it is desired to obtain access to the composition-roller. The necessary slack to compensate for this movement is obtained by straightening the chain where it lies in the curved plate 13, as shown in Figs. 1 and 3.

*Twenty-fourth, the mechanism for moving out of action the paraffine-wheel and the composition-roller.*—211, Figs. 1, 3, and 4, represents a long handle-bar extending from a point near the machine to a point beyond the composition-box, the rear end of which is attached to the upper end of the lever 212, Figs. 4, 26, and 27. 213, Figs. 4 and 27, represents an auxiliary bar extending from the upper end of the lever 187 of the paraffine-wheel, Figs. 4, 21, and 23, to a point near the center of the bar 212. 214, Fig. 26, represents a shaft upon which is located the arms 215 215, having the cam-surfaces 216 216, as shown in Figs. 4, 25, 26, and 27. The lower end of the lever 212 is attached to one end of the shaft 214 in such manner as to be capable of imparting proper movement thereto.

The operation is as follows: When it is desired to raise the paraffine-wheel and so permit the match-sticks to pass without being immersed in the bath, and the match-sticks to pass also the composition-roller without contact therewith, the handle-bar 211 is moved from its normal position shown in Fig. 27 into the position shown in dotted lines, Fig. 28. By means of this action the lever 187 of the paraffine wheel is actuated to raise the endless chain and lift the match-sticks from the bath, and the cam-surfaces 216 216 are moved into position to raise the shaft of the hexagonal pulley, and with it the movable frame and endless chain, as shown in Fig. 28. The match-sticks at this point are thus lifted out of contact with the composition-roller.

Having thus fully described my invention, what I claim as new, and desire to secure by Letters Patent, is—

1. In a machine for making matches, the combination of the following elements: an endless chain consisting of a series of independent plates hinged or linked together at their edges, each of which plates is provided with rows of perforations adapted to hold the match-sticks at right angles to the plates, and each perforation of which is less in area than the area of the match-sticks forcibly inserted into the same, a driver for moving the chain, and means, substantially as described, for inserting the match-sticks into the rows of perforations.

2. In a machine for making matches, the combination of a machine for cutting the sticks and a head for inserting them into the rows of perforations of the plates, with an endless chain consisting of a series of independent plates hinged or linked together at their edges, each of which plates is provided with rows of perforations adapted to hold the match sticks at right angles to the plates, and each perforation of which is less in area than the area of the match-sticks forcibly inserted into the same, as described.

3. In a machine for making matches, the combination of the following elements: an endless chain consisting of a series of independent plates hinged or linked together at their edges, each of which plates is provided with rows of perforations adapted to hold the match-sticks at right angles to the plates, and each perforation of which is less in area than the area of the match-sticks forcibly inserted into the same, knives adapted to cut a corresponding row of match-sticks, and a head adapted to insert the row of match-sticks in a corresponding row of perforations in one of the independent plates of the series, as described.

4. In a machine for making matches, the combination of the following elements: a cutter-head and cutter adapted to cut rows of match-sticks and insert them into a corresponding row of perforations, an endless chain having plates with rows of perforations formed therein, a driver for moving the chain, and a corresponding row of punches for discharging the completed matches.

5. In a machine for making matches, the combination of an endless chain consisting of a series of independent plates hinged or linked together at their edges, each of which plates is provided with rows of perforations adapted to hold the match-sticks at right angles to the plates, and each perforation of which is less in area than the area of the match sticks forcibly inserted into the same, with actuating gear-wheels, as described, to engage with the teeth on the series of independent plates, as described.

6. In a machine for making matches, a reciprocating cutter-head having an independent series of knives located thereon, and so held as to cut in the descending movement of the cutter-head a single row of match-sticks from the block, and in the ascending movement to insert the row of sticks in a corresponding row of perforations adapted to hold the match-sticks at right angles to the plates, and an independent plate provided with rows of perforations, as described.

7. In a machine for making matches, the combination, with a cutter-head and a series of cutters located upon the head in such manner as to be capable of independent movement thereon, of cam-surfaces adapted in the descending movement of the cutter-head to move the cutters into position to cut the match-sticks and before the upward movement of the cutter-head to move the cutters into position upon a solid portion of the cutter-head, as and for the purpose described.

8. In a machine for making matches, the combination of the following elements: a reciprocating cutter-head, a socket-plate holding the cutters which is capable of independent movement upon the cutter-head, cam-surfaces for actuating the socket-plate, and the lever and rock-shaft connections for moving the bars 101 and 102, as described.

9. In a machine for making matches, the combination, with an endless chain, of a ratchet-and-pawl mechanism adapted while the machine is in operation to give to the chain a uniform intermittent movement, and a disk and pawl adapted to communicate an auxiliary movement to the endless chain between the impulses of the uniform intermittent movement.

10. In a machine for making matches, the following combination of elements: a ratchet-wheel having a full set of teeth, a disk having one tooth, the disk being rigidly secured to the driving-shaft, a bell-crank lever and a pawl adapted to actuate the tooth of the disk, means for actuating the ratchet-wheel, and means for actuating the disk, the construction being such that the uniform intermittent movement imparted to the endless chain is supplemented at proper intervals by an auxiliary movement.

11. In a machine for making matches, the combination of the following elements: an endless chain consisting of a series of independent plates hinged or linked together at their edges, each of which plates is provided with rows of perforations adapted to hold the match-sticks at right angles to the plates, and each perforation of which is less in area than the area of the match-sticks forcibly inserted into the same, a cutter-head adapted to insert a row of match-sticks in a corresponding row of perforations in one of the independent plates, and a lock for securing the chain while the match-sticks are being inserted, as described.

12. In a machine for making matches, the combination of an endless chain having plates with rows of perforations formed therein, with a cutter-head adapted to insert a row of match-sticks in the perforations, a lock for securing the chain while the match-sticks are being inserted, and punches for discharging the matches while the chain is locked.

13. In a machine for making matches, the combination of an endless chain having plates with rows of perforations formed therein, a cutter-head adapted to insert a row of match-sticks in the row of perforations, punches for discharging the rows of matches, and a double lock for holding the chain at two points during the thrusting action.

14. In a machine for making matches, the combination, with an endless chain having plates with rows of perforations, a row of punches, and the plate 177, with the corresponding row of openings, the plate 177 being adapted to resist the thrusting action of the punches, as described.

15. In a machine for making matches, the combination of an endless chain having a slack portion, plates with rows of perforations, a main driving mechanism for communicating to a portion of the chain an intermittent movement, and an auxiliary driving mechanism for communicating to a portion of the chain a continuous movement.

16. In a machine for making matches, the combination of the main supporting parts of the machine, with an auxiliary swinging frame, an endless chain having an excess portion to compensate for the movement of the swinging frame, as described.

17. In a machine for making matches, the combination of the endless chain having the plate with rows of perforations, with the paraffine-wheel, and mechanism for giving the wheel vertical movement, as and for the purpose described.

18. In a machine for making matches, the combination of the endless chain having plates with rows of perforations, the frame-work of the machine, and the auxiliary supporting parts, with the curved plate 13, the construction being such that a slack portion of the chain is furnished, as and for the purpose described.

This specification signed and witnessed at Westville, Connecticut, this 23d day of January, 1884.

E. B. BEECHER.

Witnesses:
H. A. BARNES,
H. W. BEADLE.